(12) United States Patent
Gondal et al.

(10) Patent No.: US 10,160,665 B1
(45) Date of Patent: *Dec. 25, 2018

(54) FIXED BED METHOD FOR DISINFECTING FLUIDS

(71) Applicant: KING FAHD UNIVERSITY OF PETROLEUM AND MINERALS, Dhahran (SA)

(72) Inventors: Muhammad Ashraf Gondal, Dhahran (SA); Mohamed A. Dastageer, Dhahran (SA); Amjad B. Khalil, Dhahran (SA); Rashid Gulam Siddique, Dhahran (SA); Umair Baig, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/150,002

(22) Filed: Oct. 2, 2018

Related U.S. Application Data

(63) Continuation of application No. 15/136,399, filed on Apr. 22, 2016, now Pat. No. 10,125,031.

(Continued)

(51) Int. Cl.
*C02F 1/32* (2006.01)
*C02F 1/72* (2006.01)
(Continued)

(52) U.S. Cl.
CPC .............. *C02F 1/32* (2013.01); *C02F 1/725* (2013.01); *C02F 1/281* (2013.01); *C02F 1/283* (2013.01);
(Continued)

(58) Field of Classification Search
CPC .. C02F 11/06; C02F 11/12; C02F 1/50; C02F 1/34; C02F 1/78; C02F 2303/06;
(Continued)

(56) References Cited

U.S. PATENT DOCUMENTS

| 5,616,532 A | 4/1997 | Heller |
| 8,481,987 B2 | 7/2013 | Omoda |

(Continued)

FOREIGN PATENT DOCUMENTS

| WO | 02/083570 A1 | 10/2002 |
| WO | 2013/106776 A2 | 7/2013 |
| WO | 2013/106776 A3 | 7/2013 |

OTHER PUBLICATIONS

Mohammed A. Gondal, et al., "Photo-catalytic deactivation of sulfate reducing bacteria—a comparative study with different catalysts and the preeminence of Pd-loaded $WO_3$ nanoparticles", Royal Society of Chemistry RSC Advances, vol. 5, (2015) pp. 51399-51406.

(Continued)

*Primary Examiner* — Walter D. Griffin
*Assistant Examiner* — Cameron J Allen
(74) *Attorney, Agent, or Firm* — Oblon, McClelland, Maier & Neustadt, L.L.P.

(57) ABSTRACT

The present disclosure relates to a method of disinfecting a fluid comprising at least one live microbial organism. The method includes contacting the fluid comprising the at least one microbial organism with an effective amount of a photo-catalyst while exposing the fluid and the photo-catalyst to light from at least one light source with a wavelength of about 300-550 nm to reduce the number of the at least one live microbial organism to a predetermined level. The photo-catalyst comprises tungsten trioxide nanoparticles doped with palladium nanoparticles, and the pal- (Continued)

ladium nanoparticles are present in an amount of about 0.1-5% of the total weight of the tungsten trioxide nanoparticles and the palladium nanoparticles.

12 Claims, 15 Drawing Sheets

Related U.S. Application Data

(60) Provisional application No. 62/172,698, filed on Jun. 8, 2015.

(51) Int. Cl.
  *C02F 1/42* (2006.01)
  *C02F 1/78* (2006.01)
  *C02F 1/28* (2006.01)

(52) U.S. Cl.
  CPC ............... *C02F 1/285* (2013.01); *C02F 1/42* (2013.01); *C02F 1/722* (2013.01); *C02F 1/78* (2013.01); *C02F 2201/006* (2013.01); *C02F 2201/3222* (2013.01); *C02F 2209/02* (2013.01); *C02F 2209/03* (2013.01); *C02F 2303/04* (2013.01); *C02F 2305/08* (2013.01); *C02F 2305/10* (2013.01); *Y02W 10/37* (2015.05)

(58) Field of Classification Search
  CPC ...... C02F 2305/023; C10L 5/00; C10L 5/366; C10L 5/46; C10L 2200/0469; C10L 2290/547; C10L 2290/08; C10L 2290/28; C10L 2290/24; C10L 2290/06; C10L 2250/06; C10L 2290/00; C10L 1/32; Y02E 50/10; Y02E 50/30
  See application file for complete search history.

(56) References Cited

U.S. PATENT DOCUMENTS

| | | |
|---|---|---|
| 2003/0232186 A1 | 12/2003 | Matsuda |
| 2010/0059444 A1 | 3/2010 | Moniwa |
| 2011/0245576 A1 | 10/2011 | Keller-Spitzer |
| 2012/0201714 A1* | 8/2012 | Hashimoto ............ A61L 2/10 422/22 |
| 2013/0213892 A1 | 8/2013 | Henthorne |

OTHER PUBLICATIONS

M.A. Gondal, et al., "Synthesis, characterization, and antimicrobial application of nano-palladium-doped nano-$WO_3$", Journal of Molecular Catalysis A: Chemical. vol. 323, (2010), pp. 78-83.

A. Bagabas, et al., "Laser-induced photocatalytic inactivation of coliform bacteria from water using pd-loaded nano-$WO_3$", 10$^{th}$ International Symposium, Scientific Bases for the Preparation of Heterogeneous Catalysts, (2010), pp. 279-282.

\* cited by examiner

FIXED BED METHOD FOR DISINFECTING FLUIDS

CROSS-REFERENCE TO RELATED APPLICATIONS

The present application is a Continuation of Ser. No. 15/136,399, now allowed, having a filing date of Apr. 22, 2016 which claims the benefit of priority to U.S. provisional application No. 62/172,698 having a filing date of Jun. 8, 2015 which is incorporated herein by reference in its entirety.

BACKGROUND OF THE INVENTION

Technical Field

The present disclosure relates to methods of disinfecting a fluid. More specifically, the present disclosure relates to a method of disinfecting a fluid by photo-catalytic deactivation of microbial organisms in the presence of a photo-catalyst comprising tungsten trioxide nanoparticles (n-$WO_3$) doped with palladium nanoparticles (n-Pd) and a light for photocatalysis.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

The Word Health Organization (WHO) reports two million deaths worldwide annually due to consumption of microbial organism-infected water. Disinfection of water is therefore critical for human health and the environment. Various chemical processes based on activated carbon, coagulation and multimedia sand filtration have been applied for removing the microorganism. However, these technologies only transfer the contaminated substances from the treated water to another material that requires additional treatments and/or disposal. Although cost-effective and efficient, chlorination leaves the residual chlorine, which is toxic, in the treated water.

Additionally, disinfection of water in an oil field, e.g. produced water, is crucial for the quality of oil and protection of oil production workers and equipment. For example, sulfate-reducing bacteria (SRB) are an anaerobic microorganism that uses sulfate instead of oxygen for respiration and can survive and multiply in low oxygen environments. SRB can convert sulfate or sulfite present in water to hydrogen sulfide ($H_2S$), which combines with iron to form iron sulfide scale. SRB accumulation increases the corrosiveness of the water in the oil field, and leads to hydrogen blistering or sulfide stress cracking in the pipeline. The corrosion of iron by SRB is rapid, and unlike ordinary rust, is not self-limiting. Besides being a well-known agent for scale formation in the oil field installations, SRB can also lead to the degradation of oil quality with high sulfur content and souring. Thus, deactivation of SRB from the water produced in oil fields is needed to reduce the rust formation, the production of deadly hydrogen sulfide, radioactivity and the degradation of oil quality.

In order to control the growth of SRB, many methods, such as using bactericides, removing sulfate from water, applying caustic washing to eliminate $H_2S$, and oxidizing $H_2S$ to elemental sulfur, have been tried. Most of the organic bactericides, such as formaldehyde, phenolic and quaternary amine compounds, glutaraldehyde, chlorine, and acrolein, are harmful to the environment and human health. Additionally, SRB become resistant to the bactericides with time, in spite of high doses and repeated use. A microbiological process of deactivating SRB has also been proposed, where another breed of bacteria, such as denitrifying bacteria and sulfide-oxidizing bacteria, is introduced to compete with SRB for organic nutrients and inhibit their growth, however, it has not produced the desired effect due to the complexity of the method.

It is thus an object of the present disclosure to provide a method of disinfecting a fluid, e.g. waste water, produced water in an oil field, and sour water from an oil refinery, and more generally, a hydrocarbon contaminated fluid, by photo-catalytic deactivation of microbial organisms in the presence of a photo-catalyst comprising tungsten trioxide nanoparticles (n-$WO_3$) doped with palladium nanoparticles (n-Pd) and a light for photocatalysis.

BRIEF SUMMARY OF THE INVENTION

The present disclosure relates to a method of disinfecting a fluid comprising at least one live microbial organism. The method includes contacting the fluid comprising the at least one microbial organism with an effective amount of a photo-catalyst while exposing the fluid and the photo-catalyst to light from at least one light source with a wavelength of about 300-550 nm to reduce the number of the at least one live microbial organism to a predetermined level. The photo-catalyst comprises tungsten trioxide nanoparticles doped with palladium nanoparticles, and the palladium nanoparticles are present in an amount of about 0.1-5% of the total weight of the tungsten trioxide nanoparticles and the palladium nanoparticles.

In one or more embodiments, the palladium nanoparticles have a spheroid shape with an average particle diameter of about 4-17 nm.

In one or more embodiments, the at least one live microbial organism is at least one selected from the group consisting of bacteria, a virus, bacterial spores, protozoa, and fungi.

In one or more embodiments, the at least one light source is at least one selected from the group consisting of a laser light source, a light emitting diode, a low pressure mercury lamp, a medium pressure mercury lamp, a high pressure mercury lamp, a xenon lamp, a fluorescent lamp, an incandescent lamp, a sodium vapor lamp, a halogen lamp, a noble gas discharge, a flame, and sunlight.

In one or more embodiments, the tungsten trioxide nanoparticles have an average particle size of 60-100 nm.

In one or more embodiments, the tungsten trioxide nanoparticles have a plate and/or cylindrical shape.

In one or more embodiments, the tungsten trioxide nanoparticles doped with the palladium nanoparticles have a lower photoluminescence intensity at a wavelength of 400-500 nm than tungsten trioxide nanoparticles which are not doped with palladium nanoparticles.

In one or more embodiments, the tungsten trioxide nanoparticles doped with the palladium nanoparticles have a first band gap energy, tungsten trioxide nanoparticles which are not doped with palladium nanoparticles have a second band gap energy, and the difference between the first band gap energy and the second band gap energy is less than 10% of the second band gap energy.

In one or more embodiments, the fluid further comprises at least one hydrocarbon, and the live microbial organism is a sulfate-reducing bacterium.

In one or more embodiments, the effective amount of the photo-catalyst ranges from about 0.5 mg/ml to 1.5 mg/ml of the fluid.

In one or more embodiments, the fluid is treated with at least one selected from the group consisting of oxygen, ozone, and a peroxide before and/or during the contacting and the exposing.

In one or more embodiments, the fluid is contacted with the photo-catalyst and exposed to the light at a temperature of about 4-100° C. and a pressure of about 0.1-100 bar.

In one or more embodiments, the photo-catalyst is disposed on a surface of a substrate to form a photo-catalyst/substrate composite.

In one or more embodiments, the substrate comprises at least one selected from the group consisting of glass, stone, masonry, a metal, wood, a plastic, concrete, fibers, textiles, yarns, a ceramic, alumina, carbon, silica, an organic polymer, silicon carbide, silicon nitride, boron nitride, zirconium, and tungsten carbide.

In one or more embodiments, the photo-catalyst/substrate composite is disposed in a fixed bed reactor or fluidized bed reactor and the contacting involves passing the fluid through the fixed bed reactor or fluidized bed reactor.

In one or more embodiments, the fixed bed reactor comprises a cartridge.

In one or more embodiments, the fixed bed reactor or fluidized reactor further comprises at least one adsorbent selected from the group consisting of activated carbon, graphite, activated alumina, a molecular sieve, aluminophosphate material, silicoaluminophosphate material, zeolites, faujasite, clinoptilolite, mordenite, metal-exchanged silicoaluminophosphate, uni-polar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nano-material, adsorbent metal salts, alkaline earth metal metallic particles, ion exchange resin, linear polymers of glucose, and polyacrylamide.

In one or more embodiments, the method further comprises removing the photo-catalyst from the fluid after the contacting and the exposing.

In one or more embodiments, the photo-catalyst further comprises at least one co-catalyst selected from the group consisting of CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, CeO, and $CeO_2$.

In one or more embodiments, the co-catalyst is $CeO_2$, and the molar ratio of tungsten trioxide:$CeO_2$ in the photo-catalyst lies in the range of 1:5 to 5:1.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
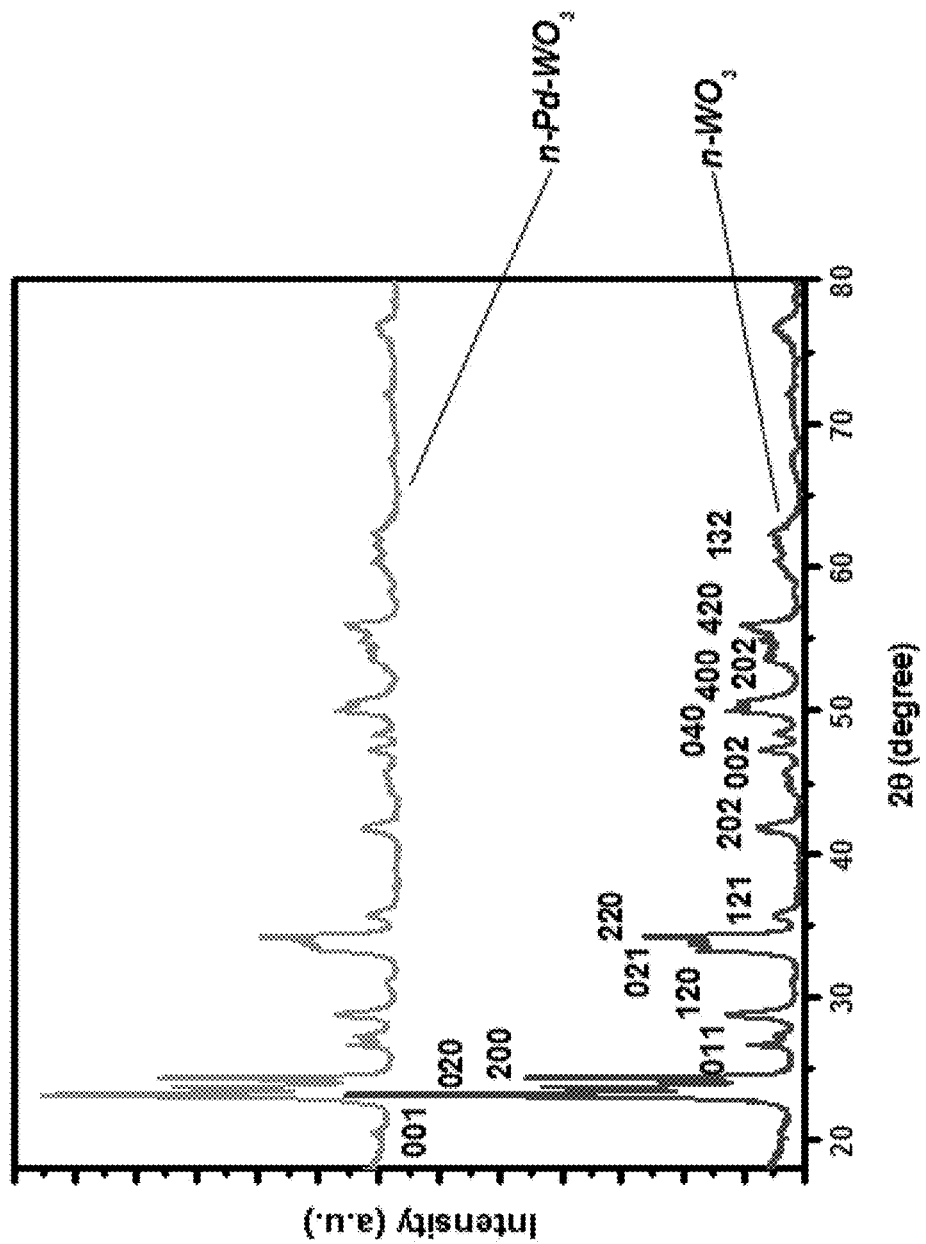
FIG. 1 is a graphical presentation of the XRD patterns of n-$WO_3$ and n-Pd/$WO_3$ according to Example 2.

The present disclosure incorporates by reference in its entirety the following publication: Mohammed A. Gondal, Mohamed A. Dastageer, Amjad B. Khalil, Siddique G. Rashid, and Umair Baig, Photo-catalytic deactivation of sulfate reducing bacteria—a comparative study with different catalysts and the preeminence of Pd-loaded $WO_3$ nanoparticles, RSC Adv., 2015, 5, 51399.

The present disclosure provides a method of disinfecting a fluid comprising at least one live microbial organism. The method includes contacting the fluid comprising the at least one microbial organism with an effective amount of a photo-catalyst while exposing the fluid and the photocatalyst to light from at least one light source with a wavelength of about 100-700 nm, about 150-650 nm, preferably about 200-600 nm, or more preferably 300-550 nm, or more preferably 325-500 nm, or more preferably 350-450 nm to reduce the number of the at least one live microbial organism to a predetermined level, such as less than 60%, less than 50%, less than 40%, less than 30%, less than 20%, less than 10%, less than 5%, or less than 1% of the initial number of the at least one live microbial organism. The numbers of the live microbial organisms can be quantified and reported as CFU, or colony forming units. One colony is formed by a single viable microbial organism when the microbial organisms are plated at a suitable dilution for single colony formation. This is a standard technique known to microbiologists. The photo-catalyst comprises tungsten trioxide nanoparticles (n-$WO_3$) doped with palladium nanoparticles (n-Pd). The palladium nanoparticles are present in an amount of about 0.1-5%, or about 0.3-4%, or preferably about 0.5-2%, or more preferably about 1% of the total weight of the tungsten trioxide nanoparticles and the palladium nanoparticles.

The disclosed method may photocatalytically deactivate any live microbial organisms, including, without limitation, bacteria (e.g. *E coli*, sulfate-reducing bacteria, *Staphylococcus aureus*, *Acinetobactor*, and *Pseudomonas aeruginosa*), viruses (e.g. influenza virus, HIV, MS2, and norovirus), bacterial spores (e.g. *Clostridium difficile*), protozoa (e.g. *Giardia*), and fungi (e.g. *Candida*). The disclosed method may also advantageously photocatalytically oxidize and degrade organic and inorganic pollutants present in the fluid.

In some embodiments, the fluid may be microorganism contaminated water, such as river water, lake water, waste water, ground water, or may be hydrocarbon contaminated fluids (liquid and/or gas) that include produced water in an oil field, a refinery industry effluent (e.g. sour water), and a chemical industry effluent. In the hydrocarbon contaminated fluid, e.g. produced water and sour water, the hydrocarbons may include alkanes, cycloalkanes and various aromatic hydrocarbons associated with crude oil, and volatile organic compounds such as benzene, toluene, ethylbenzene, and xylene. The alkanes, also known as paraffins, are saturated hydrocarbons with straight or branched chains which contain only carbon and hydrogen and have the general formula $C_nH_{2n+2}$. They generally have from 5 to 40 carbon atoms per molecule, although trace amounts of shorter or longer molecules may be present in the mixture. The cycloalkanes, also known as naphthenes, are saturated hydrocarbons which have one or more carbon rings to which hydrogen atoms are attached according to the formula $C_nH_{2n}$. The aromatic hydrocarbons are unsaturated hydrocarbons which have one or more planar six-carbon rings called benzene rings, to which hydrogen atoms are attached with the formula $C_nH_n$. The proportion of the hydrocarbons present in the hydrocarbon contaminated fluid may vary, for example, depending on the oil field where the hydrocarbon contaminated fluid such as produced water is generated. In some embodiments, the concentration of the hydrocarbons associated with crude oil in produced water lies in the range of 1-100 mg/L, or 5-90 mg/L, or 10-80 mg/L, or 20-70 mg/L, or 30-60 mg/L, or 40-50 mg/L, and the concentration of benzene, toluene, ethylbenzene, and xylene (BTEX) lies in the range of 0.5-1500 mg/L, or 1-1000 mg/L, or 10-900 mg/L, or 50-800 mg/L, or 100-700 mg/L, or 200-600 mg/L, or 300-500 mg/L, or 350-400 mg/L.

In a preferred embodiment, the fluid is a hydrocarbon contaminated fluid, e.g. produced water in an oil field, comprising sulfate-reducing bacteria. Sulfate-reducing bacteria (SRB) are an anaerobic microorganism that plays an important role in biogeochemical processes. SRB use sulfate instead of oxygen for respiration and hence can survive and multiply in low oxygen environments (See L. L. Barton and G. D. Fauque, *Adv. Appl. Microbiol.*, 2009, 68, 41-98; N. Pfennig, F. Widdel and H. G. Truper, The dissimilatory sulfate reducing bacteria, *The Procaryotes. A handbook on habitats, isolation and identification of bacteria*, Springer Verlag, New York, 1981; and A. C. Johnson and M. Wood, The ecology and significance of sulfate-reducing bacteria in sandy aquifer sediments of the London basin, W: *Proceedings of International Symposium on Subsurface Microbiology*, Bath, Sep. 19-24, 1993, each incorporated herein by reference in their entirety). SRB can convert sulfate or sulfite present in water to hydrogen sulfide ($H_2S$), which combines with iron to form iron sulfide scale. SRB accumulation increases the corrosiveness of produced water in the oil field, and leads to hydrogen blistering or sulfide stress cracking in the pipeline. The corrosion of iron by SRB is rapid, and unlike ordinary rust, is not self-limiting. Besides being a well-known agent for scale formation in the oil field installations, SRB can lead to the degradation of oil quality with high sulfur content and souring. Deactivation of SRB from produced water in the oil fields with the disclosed method can reduce the rust formation, the production of deadly hydrogen sulfide, radioactivity and the degradation of oil quality.

A photo-catalyst is a material that can activate or change the rate of a chemical reaction as a result of exposure to light, such as ultraviolet or visible light. When a photo-catalyst absorbs a photon of light having sufficient energy, an electron can be excited. The resulting "hole/electron" pair is highly reactive and can be coupled to a variety of reactions that can degrade organic materials. More specifically, an electron is excited across a band-gap from a valence band to a conduction band when a photon is absorbed by a photo-catalyst and when the energy of the photon is equal to or greater than the band gap energy separating the electrons in the valence band from those in the conduction band. This creates a negatively charged electron in the conduction band and a positively charged hole in the valence band. When the resultant electron-hole pair migrates to the photo-catalyst/fluid interface, oxidation-reduction processes are initiated. The hole is a powerful oxidizing agent. For instance, the hole can oxidize water to create hydroxyl radicals (OH.). Hydroxyl radicals can react with oxygen to form superoxide anion ($O_2.^-$). Electrons reduce oxygen to various reactive species including O., $O_2.$, $O_2H.$, $HO_2$—, $H_2O_2$ and OH. The hydroxyl radical is an extremely potent oxidizing agent (redox potential of +2.8 V), capable of oxidizing almost all organic compounds. By comparison, the redox potentials for the more conventional oxidants chlorine and ozone are +1.36 and +2.07 V, respectively. Hydroxyl radical and superoxide anion can deactivate a variety of microbial organisms and degrade a wide variety of organic materials to produce, for example, $H_2O$ and $CO_2$. The holes can also oxidize organic materials directly.

In one embodiment, the photo-catalyst comprises tungsten trioxide nanoparticles (n-$WO_3$), the surface of which is doped or loaded with palladium nanoparticles. The tungsten trioxide nanoparticles may be prepared by a precipitation method described by S. Supothina, P. Seeharaj, S. Yoriya and M. Sriyudthsak, Ceram. Int., 2007, 33, 931-936, incorporated herein by reference in its entirety. Alternatively, the tungsten trioxide nanoparticles can be synthesized by a variety of other methods including, but not limited to, solid state reaction, combustion, solvothermal synthesis, pyrolysis (spray and flame), chemical vapor deposition, physical vapor deposition, ball milling, high energy grinding, and plasma synthesis (e.g. radio frequency inductively-coupled plasma (RF-ICP)). Radio frequency inductively-coupled plasma (e.g. thermal) methods as described in U.S. Pat. No. 8,003,563, which is incorporated herein by reference in its entirety, may be useful and preferable because of low contamination (no electrodes) and high production rates and facile application of precursors either in the gas, liquid or solid form. For example, in preparing $WO_3$ nanoparticles (n-$WO_3$), a liquid dispersion of ammonium metatungstate in water (5-20 wt % solid in water) can be sprayed into the plasma volume using a two-fluid atomizer. Preferably, the precursor can be present to about 20 wt % solid in water. The plasma can be operated at about 25 kW plate power with argon, nitrogen and/or oxygen gases. The particles formed from the condensed vapor from the plasma can then be collected on filters. In some embodiments, the $WO_3$ particle surface areas as measured using BET range from about 1 $m^2/g$ to about 500 $m^2/g$, about 15 $m^2/g$ to 30 $m^2/g$, or about 20 $m^2/g$. In some embodiments, the obtained n-$WO_3$ may be heated/calcined from about 200° C. to about 700° C., or about 300° C. to about 500° C.

In another embodiment, the photo-catalyst may comprise one or more tungsten (W) compounds in place of tungsten trioxide or in addition to tungsten trioxide and doped with palladium nanoparticles, with the palladium nanoparticles present in an amount of about 0.1-5%, or about 0.3-4%, or preferably about 0.5-2%, or more preferably about 1% of the total weight of the tungsten compound(s) and the palladium nanoparticles. The tungsten compounds are preferably in the form of nanoparticles and may include, without limitation, a tungsten oxide, oxycarbide, oxynitride, oxyhalide, or halide, with the tungsten compounds having a +1, +2, +3, +4, +5, +6, +7, or +8 oxidation state or formal charge, or an average oxidation state or formal charge of about +1 to about +8, about +4 to about +8, about +6 to about +8, or about +1 to about +4.

In some embodiments, the tungsten trioxide nanoparticles (n-$WO_3$) may have random shapes that include a plate and/or a cylindrical shape, and have an average particle size of 30-200 nm, or 40-180 nm, or 50-150 nm, or 60-100 nm, or 70-90 nm. The average particle size refers to an average length of the longest edge of the tungsten trioxide nanoparticles when the tungsten trioxide nanoparticles have a non-spherical shape, whereas the average particle size refers to an average diameter when the tungsten trioxide nanoparticles have a spherical or spheroid shape.

In one embodiment, the tungsten trioxide nanoparticles are doped or loaded with the palladium nanoparticles by a wet incipient method. In an exemplary method, a solution of one or more palladium salts, for example, palladium nitrate dihydrate ($Pd(NO_3)_2.2H_2O$) or palladium acetate in deionized water is poured dropwise with a micropipette onto $WO_3$ nanoparticles. The amount of palladium nitrate dihydrate ($Pd(NO_3)_2.2H_2O$) or palladium acetate is such that palladium metal is present in an amount of about 0.1-5%, or about 0.3-4%, or preferably about 0.5-2%, or more preferably about 1% of the total weight of the tungsten trioxide nanoparticles and the palladium nanoparticles. The resultant paste is mixed, dried, and calcinated at 300-500° C. Finally, the obtained product is heated in a programmable furnace for 3 h under continuous flow of highly pure hydrogen (99.99%) at 300-400° C. In other embodiments, the tungsten trioxide nanoparticles may be doped or loaded with the palladium nanoparticles by photoreduction and sputtering.

In some embodiments, the palladium nanoparticles have a spheroid shape with an average particle diameter of about 1-30 nm, 2-25 nm, 3-20 nm, 4-17 nm, or 5-12 nm. In a preferred embodiment, the palladium nanoparticles are dispersed on the surface of the tungsten trioxide nanoparticles, providing a high surface area in contact with the light for photo-catalytic reaction which generates highly oxidizing radicals such as hydroxyl radicals and super-oxide radicals that deactivate the microbial organisms by oxidizing their cell membrane. In some embodiments, the coverage of the surface of the tungsten trioxide nanoparticles by the palladium nanoparticles is no greater than 90%, no greater than 80%, or no greater than 60%, or preferably no greater than 50%, or more preferably no greater than 30%.

In other embodiments, the tungsten trioxide nanoparticles are doped or loaded with nanoparticles of palladium oxide and/or hydroxide. In some embodiments, the nanoparticles of palladium oxide and/or hydroxide are present in an amount of about 0.1-5%, or about 0.3-4%, or preferably about 0.5-2%, or more preferably about 1% of the total weight of the tungsten trioxide nanoparticles and the nanoparticles of palladium oxide and/or hydroxide.

In still other embodiments, the photo-catalyst of the present disclosure comprising the tungsten trioxide nanoparticles doped or loaded with the palladium nanoparticles may further comprise a co-catalyst. The co-catalyst includes a material that enhances the photocatalytic properties of the photo-catalyst. In some embodiments, the co-catalyst may be a compound or a semiconductor that is capable of being reduced by electron transfer from the conduction band of the photo-catalyst. For example, the co-catalyst may have a conduction band having a lower energy than the conduction band of the photo-catalyst, or the co-catalyst may have a lowest unoccupied molecular orbital having a lower energy than the conduction band of the photo-catalyst. When a term such as "lower energy" and "higher energy" is used to compare a band or a molecular orbital of a semiconductor or a photo-catalyst with another band or molecular orbital, it means that an electron loses energy when it is transferred to the band or molecular orbital of lower energy, and an electron gains energy when it is transferred to the band or molecular orbital of higher energy.

In some embodiments, the co-catalyst may be a metal oxide, e.g. CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, CeO, $CeO_2$, or combinations thereof, capable of reducing $O_2$. For example, it is believed that $CeO_2$ can reduce $O_2$ gas by electron transfer. In doing so, it is believed that $Ce^{3+}$ transfers an electron to $O_2$ and is converted to $Ce^{4+}$ as a result. In one embodiment, the photo-catalyst may transfer an electron to $CeO_2$, thus converting $Ce^{4+}$ to $Ce^{3+}$, and the $Ce^{3+}$ may then reduce $O_2$. $Ce^{3+}$ may also be present as a result of equilibrium processes involving $CeO_2$ and $O_2$, and superoxide radical ion ($O_2.^-$). $O_2$ and superoxide radical ion in such an equilibrium process may be adsorbed to the surface of solid $CeO_2$ or present in the atmosphere. $Ce^{3+}$ may also be present as a result of oxidation and reduction reactions with cerium species of different oxidation states that may be added intentionally or present as impurities.

Any useful ratio of photo-catalyst to co-catalyst may be used. In some embodiments, a photocatalytic composition may have a molar ratio (photo-catalyst: co-catalyst) of about 1:5 to about 5:1, about 1:3 to about 3:1, about 1:2 to about 2:1, or about 1:1.

In some embodiments, the co-catalyst is $CeO_2$, and the molar ratio of $WO_3$:$CeO_2$ is about 1:5 to about 5:1, about 1:3 to about 3:1, about 1:2 to about 2:1, or about 1:1.

In other embodiments, the co-catalyst $CeO_2$ is doped with Sn, e.g. from stannous octoate, with the amount of Sn at 1-10 molar %, or 2-8 molar % of the number of moles of $CeO_2$. The presence of Sn may stabilize the excited state of the photo-catalyst.

In some embodiments, the co-catalyst may improve the catalytic performance of the photo-catalyst by increasing the rate of photocatalysis by at least about 120%, at least about 150%, at least about 180%, at least about 200%, at least about 300%, or at least about 500%, as compared to the rate of photocatalysis of the photo-catalyst in the absence of the co-catalyst.

In some embodiments, the light source may be at least one selected from a laser light source, a light emitting diode (LED), a low pressure mercury lamp, a medium pressure mercury lamp, a high pressure mercury lamp, a xenon lamp, a fluorescent lamp, an incandescent lamp, a sodium vapor lamp, a halogen lamp, a noble gas discharge, a flame and sunlight. In a preferred embodiment, a laser light source operating in either continuous or pulsed mode and/or an LED are used as a light source.

In some embodiments, the laser light source has one or more of the following types of lasers, without limitation: helium-neon laser, argon laser, krypton laser, xenon ion laser, nitrogen laser, excimer laser, dye lasers (e.g. stilbene, coumarin 102, rhodamine 6G, etc), helium-cadmium (HeCd) metal-vapor laser, helium-mercury (HeHg) metal-vapor laser, helium-selenium (HeSe) metal-vapor laser, helium-silver (HeAg) metal-vapor laser, strontium vapor laser, neon-copper (NeCu) metal-vapor laser, copper vapor laser, gold vapor laser, manganese (Mn/$MnCl_2$) vapor laser, ruby laser, Nd:YAG laser, cerium doped lithium strontium (or calcium) aluminum fluoride (Ce:LiSAF, Ce:LiCAF) laser, and a semiconductor laser (e.g. GaN, InGaN, AlGaInP, AlGaAs, etc).

Compared with a mercury lamp, an LED has a narrower spectral output centered around a specific wavelength, e.g. ±10 nm. Additionally, an LED converts the input electrical power into useful light, particularly UV light at a wavelength of less than 400 nm, more efficiently than a mercury lamp by generating less heat and light at unwanted wavelengths, e.g. infrared light. Further, an LED has a tighter emission angle than a mercury lamp, allowing the majority of the light output to be focused directly where it is required.

The power of any single light source, or the total power of a plurality of the light sources, and the number of the light sources may vary widely, depending on the volume of the fluid being disinfected, the initial number and type of the microbial organism in the fluid, the type of the light source used (e.g. a laser light source, a mercury lamp, or an LED), the way the light sources are placed, e.g. the distance between the light source and a target area of the fluid and the photo-catalyst and the distribution of the light in the fluid and the photo-catalyst, the amount and composition of the photo-catalyst contacting the fluid, the wavelength of the light, the disinfection efficiency and/or rate desired, etc. In a preferred embodiment, the light is monochromatic. In a preferred embodiment, the light source is a laser light source operating in pulsed mode with a wavelength of 355 nm, and the power of the pulsed laser light source is about 0.2-2 mJ/pulse laser irradiation/ml fluid, or about 0.4-1.8 mJ/pulse laser irradiation/ml fluid, or about 0.6-1.5 mJ/pulse laser irradiation/ml fluid, or about 0.8-1.2 mJ/pulse laser irradiation/ml fluid. The pulse width of the laser light may be 3-12 ns, or 5-10 ns, or 7-9 ns. In other embodiments, the power of the light source provides a light intensity in a range of 3-500 mW/$cm^2$, 20-480 mW/$cm^2$, 50-450 mW/$cm^2$, 80-400 mW/$cm^2$, 100-350 mW/$cm^2$, 150-300 mW/$cm^2$, or 180-250 mW/$cm^2$. The photo-catalytic deactivation of the microbial organism in the fluid by the disclosed method entails an interaction between the light and the photo-catalyst, since the light alone without the photo-catalyst may result in a much slower deactivation rate of the microbial organism (e.g. the deactivation rate with only the light may be 1/200, 1/150, 1/100, 1/50, 1/30, 1/20, 1/10, 1/5/or 1/3 of the deactivation rate with both the light and the photo-catalyst interacting with each other), and since the photo-catalyst without the light may result in no deactivation of the microbial organism, as observed by A. Bagabas, M. Gondal, A. Khalil, A. Dastageer, Z. Yamani, and M. Ashameri, Laser-induced photocatalytic inactivation of coliform bacteria from water using pd-loaded nano-$WO_3$, 10th International Symposium "Scientific Bases for the Preparation of Heterogeneous Catalysts", 2010, incorporated herein by reference in its entirety.

In a preferred embodiment, the light from the light source has a wavelength of 300-550 nm and interacts with the photo-catalyst in the presence of water and oxygen. The interaction between the light and the photo-catalyst generates electrons and holes ($h^+$). The electrons reduce $O_2$ to form super oxide radicals, while the holes oxidize $H_2O$ to form hydroxyl radicals. Both the super oxide radicals and the hydroxyl radicals damage or kill the microbial organisms in the fluid by, for example, oxidizing the cell membrane of the microbial organisms. Additionally, the light in the ultraviolet light wavelength range (10-400 nm) can convert $O_2$ to $O_3$ that in turn produces highly reactive hydroxyl radicals. $O_2$ may be from atmospheric air and/or other sources, such as an $O_2$ gas tank, from which $O_2$ may be pumped or injected into the fluid before and/or while the fluid and the photo-catalyst are exposed to the light. Water may be present in the fluid, or may be introduced into the fluid in the form of liquid water or water vapor. Because the super oxide radicals and particularly the hydroxyl radicals are also effective in oxidizing and decomposing dyes (e.g. anthocyanins, methylene blue, and basic blue 41), surfactants, volatile organic compounds (e.g. methane, ethane, propane, butane, benzene, ethylbenzene, toluene, acetone, diethyl ether, methanol, ethanol, isopropyl alcohol, formaldehyde, acetaldehyde formaldehyde, propionaldehyde, ethyl acetate, and xylene), small organic molecules (e.g. caffeine, diclofenac, ibuprofen, geosmin, flumequine, naphthalene, anthracene, salicylic acid, phenol, 2-chlorophenol, 4-chlorophenol, benzoic acid, 2-naphthol, and fluorescein), organometallic compounds, crude oil that contains hydrocarbons including alkanes, cycloalkanes and various aromatic hydrocarbons, $NO_x$ (e.g. NO, $NO_2$, $N_2O$, and HONO), $SO_x$ (e.g. $SO_2$, and $SO_3$), CO, $O_3$, soot, algae, eggs of aquatic organisms, and planktonic larvae, the disclosed method can be used advantageously to disinfect, as well as remove toxic pollutants from, industrial waste water, for example, a hydrocarbon contaminated waste water or fluid, particularly produced water, which may contain 1-100 mg/L, or 5-90 mg/L, or 10-80 mg/L, or 20-70 mg/L, or 30-60 mg/L, or 40-50 mg/L of hydrocarbons associated with crude oil and 0.5-1500 mg/L, or 1-1000 mg/L, or 10-900 mg/L, or 50-800 mg/L, or 100-700 mg/L, or 200-600 mg/L, or 300-500 mg/L, or 350-400 mg/L of benzene, toluene, ethylbenzene, and xylene (BTEX), and sour water, from the petro-chemical industry.

Sour water is the wastewater produced during many refining processes. It typically contains hydrogen sulfide and ammonia, which must be removed by sour water strippers before the water can be reused elsewhere in the refinery or sent to a wastewater system. Besides hydrogen sulfide (typically at 300-12,000 ppm by weight) and ammonia (typically at 100-8,000 ppm by weight), sour water may also contain phenol (typically up to 300 ppmw), hydrogen cyanide (at variable concentrations, e.g. 10-20 ppmw), selenium, organic acids, caustic substances, mineral acids, hydrocarbons, chlorides, sulfates, and mercaptans. Because of the likely presence of sulfates, hydrocarbons, and phenol in sour water, the disclosed method may be advantageously used to treat sour water in combination with the sour water strippers that effectively remove ammonia and hydrogen sulfide but not phenol hydrogen cyanide, and many hydrocarbons, particularly heavier hydrocarbons. In one embodiment, the disclosed method may be used to treat sour water to photo-catalytically deactivate microbial organisms, particularly sulfate-reducing bacteria what are likely present in sour water containing sulfates, and to oxidize and degrade at least some of the phenol, hydrogen cyanide, and hydrocarbons in the sour water before the sour water is fed to the sour water strippers. The advantage of this pre-treatment of the sour water with the disclosed method is to reduce or eliminate any potential generation of additional hydrogen sulfide by sulfate reducing bacteria after the sour water stripper treatment, reduce the amount of the hydrocarbons potentially contacting the sour water strippers (sour water is usually de-oiled before entering the sour water strippers), and reduce the amounts of phenol and hydrogen cyanide, which are almost not removed in the sour water strippers, in the stripped water. In another embodiment, the disclosed method may be used to treat sour water stripped of hydrogen sulfide and ammonia (after the sour water stripper treatment) to remove phenol, hydrogen cyanide, and hydrocarbons and deactivate microbial organisms, particularly sulfate-reducing bacteria, from the stripped water. In still another embodiment, the disclosed method may be used to treat sour water before the treatment with sour water strippers as well as the stripped water after the sour water stripper treatment. The phenol in the sour water is preferably deeply oxidized and decomposed to water and carbon dioxide, and the hydrogen cyanide in the sour water is preferably oxidized to cyanate ($NCO^-$), which is safer than cyanide, by the disclosed method.

In another preferred embodiment, the fluid, for example, a hydrocarbon contaminated fluid, produced water, and sour water, is treated with at least one selected from the group consisting of ozone, and peroxides, for example, hydrogen peroxide, before and/or while the fluid and the photo-catalyst are exposed to the light.

The light, preferably with a wavelength of 300-550 nm, more preferably with a wavelength in the UV range of 300-400 nm, may interact with ozone, preferably in the presence of water, to produce hydroxyl radicals that oxidize and deactivate the microbial organisms in the fluid independent of the photo-catalyst, as disclosed by Katarína Šilhárová, Ján Derco, Peter Tölgyessy, Mária Valičková, Michal Melicher, Reducing of organic petroleum compounds in water by ozonation/UV processes, 45th International Petroleum Conference, Jun. 13, 2011, Bratislava, Slovak Republic, incorporated herein by reference in its entirety. In some embodiments, the concentration of $O_3$ in the fluid is about 0.1-5 mg/L, about 0.2-4.5 mg/L, about 0.5-4 mg/L, about 0.8-3 mg/L, or about 1-2 mg/L.

The light, preferably with a wavelength of 300-550 nm, more preferably with a wavelength in the UV range of 300-400 nm, may convert peroxides, e.g. $H_2O_2$, to hydroxyl radicals that oxidize and deactivate the microbial organisms in the fluid independent of the photo-catalyst. In one embodiment, the fluid is pre-treated with $H_2O_2$ before contacting the photo-catalyst and being exposed to the light. In another embodiment, the fluid is treated with $H_2O_2$ while contacting the photo-catalyst and being exposed to the light. In still another embodiment, the fluid is pretreated with $H_2O_2$, and is treated with additional $H_2O_2$ while contacting the photo-catalyst and being exposed to the light to replace the consumed $H_2O_2$ and keep a $H_2O_2$ concentration of at least 40%, at least 50%, at least 60%, at least 70%, or at least 80% of the initial $H_2O_2$ concentration. Since $H_2O_2$ is thermodynamically unstable and decomposes to form water and oxygen ($2H_2O_2 \rightarrow 2H_2O+O_2$), with the rate of decomposition increasing with rising temperature, concentration and pH, the disclosed disinfection method may be preferably performed at a low ambient temperature (e.g. 4-30° C., preferably 10-25° C., or preferably 15-20° C.) and/or under a high pressure condition to inhibit $H_2O_2$ decomposition and/or keep $O_2$ from escaping from the fluid, e.g. under a pressure greater than an ambient pressure of about 1 bar, such as 2-100 bar, or 5-90 bar, or 10-80 bar, or 15-70 bar, or 20-60 bar, or 30-50 bar. The fluid may be treated with $H_2O_2$ by adding a $H_2O_2$ containing solution to the fluid, or by pumping or injecting a $H_2O_2$ containing solution or vapor into the fluid. The initial concentration of the $H_2O_2$ in the fluid may be about 0.2-4 g/L, about 0.4-3 g/L, or about 0.6-2 g/L. The pH of the fluid is preferably in the acidic range of about 1-6, preferably about 2-5, or more preferably about 3.

In one embodiment of the method, the contacting of the fluid with the photo-catalyst may be performed by mixing an effective amount of the photo-catalyst with a certain volume of the fluid, preferably with the mixture under constant agitation (e.g. stirring, shaking, or vortexing), while exposing the mixture to the light. The effective amount of the photo-catalyst per unit volume of the fluid may vary depending on the composition of the photo-catalyst, the initial number and the type of the microorganism in the fluid, the wavelength of the light and type of the light source, the extent or efficiency of contact between the photo-catalyst and the light determined by the distribution of the light and the photo-catalyst in the fluid, the disinfection efficiency and rate desired, etc, and may typically range from about 0.1-3 mg/ml, or 0.3-2 mg/ml, or 0.5-1.5 mg/ml of the fluid. In some embodiments, the light source may be placed in such a way that it is not in direct contact with the fluid/photo-catalyst mixture, for example, the light source may be placed on top of, on a side of, and/or underneath a vessel containing the mixture, with the light traveling from the light source to reach the mixture, or a portion thereof, preferably unimpeded, and with the vessel walls preferably made of materials substantially transparent to the light, e.g. light transparent glass or plastic. The distance between the light source and a target area of the mixture may vary, depending on the desired power level or intensity of the light the fluid and the photo-catalyst are exposed to and the desired light coverage of the fluid and the photo-catalyst. To adjust the light coverage of the fluid and the photo-catalyst when the light source is a laser light source, a set of lenses and mirrors may be used to increase the diameter of the laser beam from the laser light source, for example, to 0.5-10 cm, 1-8 cm, 2-6 cm, or 3-4 cm. The light source may be stationary or may be in motion to increase the light coverage of the fluid and the photo-catalyst. In other embodiments, the light source may be placed in a way that it is in direct contact with the fluid/photo-catalyst mixture, for example, the light source may be immersed in the mixture of the fluid and the photo-catalyst. The light source may be stationary or may be in motion. These are preferred embodiments when more power of the light is desired to penetrate the fluid and reach the photo-catalyst.

In another embodiment, the photo-catalyst comprising the tungsten trioxide nanoparticles (n-WO$_3$) doped with the palladium nanoparticles is disposed on a surface of a substrate to form a photo-catalyst/substrate composite with a photo-catalyst layer or a coating that can come into contact with the light and the material (e.g. microbial organisms, organic compounds, etc) to be deactivated and/or decomposed. In some embodiments, the thickness of the photo-catalyst layer or coating is 1-200 µm, or 10-180 µm, or 30-150 µm, or 50-120 µm, or 80-100 µm. The substrate may comprise any suitable material which is inert or stable in the fluid during the disclosed photo-catalytic disinfection process and which provides a surface for the deposition of the photo-catalyst. Non-limiting examples of the suitable substrate material include glass (e.g. borosilicate glass, soda glass, or quartz), stone, masonry, metals (e.g. stainless steel, gold, aluminum, titanium, copper, and various metal alloys), woods, plastics (e.g. polycarbonate, polystyrene, nylon, and polyethylene), concrete, fibers, textiles, yarns, ceramics, alumina, carbon, silica, organic polymers, silicon carbide, silicon nitride, boron nitride, zirconium, and tungsten carbide. In some embodiments, the photo-catalyst covers at least about 30%, at least about 50%, at least about 70%, at least about 90%, or at least about 95% of the substrate surface. Since the photo-catalyst is dispersed on the surface the substrate, by contacting the fluid with the photo-catalyst/substrate composite, this embodiment may advantageously increase the surface area of the photo-catalyst interacting with both the microbial organisms to be deactivated in the fluid and the light to more effectively produce the oxidative radicals to deactivate the microbial organisms in the fluid. In a preferred embodiment, the placement of the light source is such that uniform illumination of the photo-catalyst within the volume of the fluid to be treated is achieved. In another preferred embodiment, the substrate does not block illumination of the volume of the fluid to be treated. Thus, the volume fraction of the substrate is kept to minimal and/or has high transparency to the activating photons. To enhance volumetric illumination, the substrate material is preferably made from glass or other materials transparent or semi-transparent to the photo-activating wavelengths described above.

In one embodiment, the photo-catalyst layer or coating directly contacts the substrate.

In another embodiment, if the photo-catalyst is known to react with the substrate it is attached to, a protective layer may be included that keeps the photo-catalyst from directly contacting the substrate, for example, when the reactive species (e.g., hydroxyl radicals) that allow the photo-catalyst to deactivate the microbial organisms that settle on a surface can also degrade the surface if the surface (e.g., plastic) includes materials that are susceptible to attack by the reactive species. In this case, apatite can be used as a protective layer. In another embodiment, the photo-catalyst can be encapsulated in a protective layer. Further discussion of these techniques can be found in JP2008-088436 and U.S. Pat. No. 6,217,999, each incorporated herein by reference in its entirety.

By being disposed upon the substrate, the photo-catalyst can be a separately formed layer, formed prior to disposition upon the substrate. In another embodiment, the photo-catalyst layer or coating can be formed on the substrate surface by, for example, without limitation, vapor deposition, chemical vapor deposition, physical vapor deposition, laminating, pressing, rolling, soaking, melting, gluing, sol-gel deposition, spin coating, dip coating, bar coating, brushing coating, sputtering, thermal spraying, flame spray, plasma spray, high velocity oxy-fuel spray, atomic layer deposition, cold spraying, aerosol deposition, or sputtering. In still another embodiment, the photo-catalyst can be incorporated into the surface of the substrate, e.g., at least partially embedded within the surface.

In a preferred embodiment where the photo-catalyst further comprises the co-catalyst CeO$_2$, a dispersion comprising the photo-catalyst, CeO$_2$, a dispersing media (e.g. water, methanol, or ethanol), and optionally a binder may be made with the molar ratio of the photo-catalyst to CeO$_2$ being between 1-99 molar %, or 20-80 molar %, or 40-60 molar % photo-catalyst and 99-1 molar %, or 80-20 molar %, or 60-40 molar % CeO$_2$; wherein the dispersion has about 2-50 wt %, or about 5-40 wt %, or about 10-30 wt %, or about 15-25 wt %, or about 20 wt % solid materials. The dispersion may be homogenized by ultrasound.

After the dispersion is applied to a substrate, the dispersion and the substrate may be heated at a sufficient temperature and length of time to evaporate substantially all the dispersing media from the dispersion. In some embodiments, the dispersion is applied to cover the substrate, either in whole or in part, or to a surface of the substrate to create a coating or surface layer. In some embodiments, at least 90%, at least 95%, at least 99% of the dispersing media is removed. In another embodiment, the dispersion covered substrate is heated at a temperature between about room temperature and 500° C. In another embodiment, the dispersion covered substrate is heated at a temperature between about 90° C. and about 150° C. In another embodiment, the dispersion covered substrate is heated at a temperature of about 120° C. While not wanting to be limited by theory, it is believed that keeping the temperature below 500° C. may reduce the possibility of thermal deactivation of the photo-catalyst and/or co-catalyst, for example, due to dopant diffusion, dopant inactivation, loaded material decomposition or coagulation (reduction in total active surface area). In another embodiment, the dispersion covered substrate is heated for a time between about 10 seconds and about 2 hours. In another embodiment, the mixture covered substrate is heated for a time of about 1 hour. The dispersions described herein can be applied to virtually any substrate. Other methods of applying the dispersion to a substrate can include slot/dip/spin coating, brushing, rolling, soaking, melting, gluing, or spraying the dispersion on a substrate. A proper propellant can be used to spray a dispersion onto a substrate.

In one embodiment, the photo-catalytic surface of the photo-catalyst/substrate composite may be in contact with the fluid by batch mixing the photo-catalyst/substrate composite with the fluid, preferably under constant agitation (e.g. stirring, shaking, or vortexing). In other embodiments, the photo-catalyst/substrate composite may be in the form of granular particles, which can be installed in a fixed bed reactor or fluidized bed reactor. The fluid can be applied to a fixed bed column or reactor of the photo-catalyst/substrate composite to come into contact with the photo-catalytic surface of the composite while the fluid and the photo-catalyst/substrate composite are exposed to the light from the light source, which can be stationary or in motion and which may be placed in direct contact with the fluid and the photo-catalyst/substrate composite or not, and the effluent of the column or reactor comprises the treated fluid with reduced numbers of the live microbial organisms. In some embodiments, the fixed bed reactor of the photo-catalyst/substrate composite comprises a cartridge for easy carry and use. For example, such a cartridge can be attached to a faucet of ground water, or installed in a container where wastewater or a hydrocarbon contaminated liquid containing the microbial organisms passes through the cartridge from an upper level of the container, with the disinfected wastewater or hydrocarbon contaminated liquid exiting the cartridge at a lower level of the container with reduced numbers of the microbial organisms. Further, the fixed bed reactor and cartridge, and the fluidized bed reactor described below can include adsorbents besides the photo-catalyst/substrate composite, such as activated carbon, graphite, activated alumina, a molecular sieve, aluminophosphate material, silicoaluminophosphate material, zeolites, faujasite, clinoptilolite, mordenite, metal-exchanged silicoaluminophosphate, unipolar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nano-material, adsorbent metal salts (including, but not limited to perchlorates, oxalates, and alkaline earth metals), alkaline earth metal metallic particles, ion exchange resin, linear polymers of glucose, polyacrylamide, or a combination thereof, to advantageously adsorb from the fluid biological contaminants such as bacterial toxins and bacterial cell debris, harmful pollutants such as benzene, xylene, toluene, phenol, ethyl benzene and their photo-catalytic oxidation products that may still be toxic, heavy metal ions and dyes. In a preferred embodiment, the adsorbent is installed in a part of the fixed bed, cartridge, or fluidized bed that is separate from and downstream of the part of the fixed bed, cartridge, or fluidized bed where the photo-catalyst/substrate composite is installed to avoid interference with the exposure of the fluid and the photo-catalyst/substrate composite to the light by the adsorbent and to facilitate adsorption of the biological contaminants released by the deactivated microbial organisms.

Alternatively, the photo-catalyst/substrate composite can form a fluidized bed reactor with the fluid comprising the microbial organisms, for example, by introducing the pressurized fluid, either in a liquid form, or in a gaseous form, or in a mixed liquid and gaseous form, through the particulate medium of the photo-catalyst/substrate composite. In the fluidized bed reactor, contact between the photo-catalyst and the fluid is greatly enhanced while both are exposed to the light, as compared to a fixed bed column or reactor, leading to a higher photo-catalytic deactivation efficiency and/or rate of the microbial organisms in the fluid. In a fluidized bed reactor, the light source can be likewise stationary or in motion and can be placed in direct contact or not with the mixture of the fluid and the photo-catalyst/substrate composite.

Figure 5:
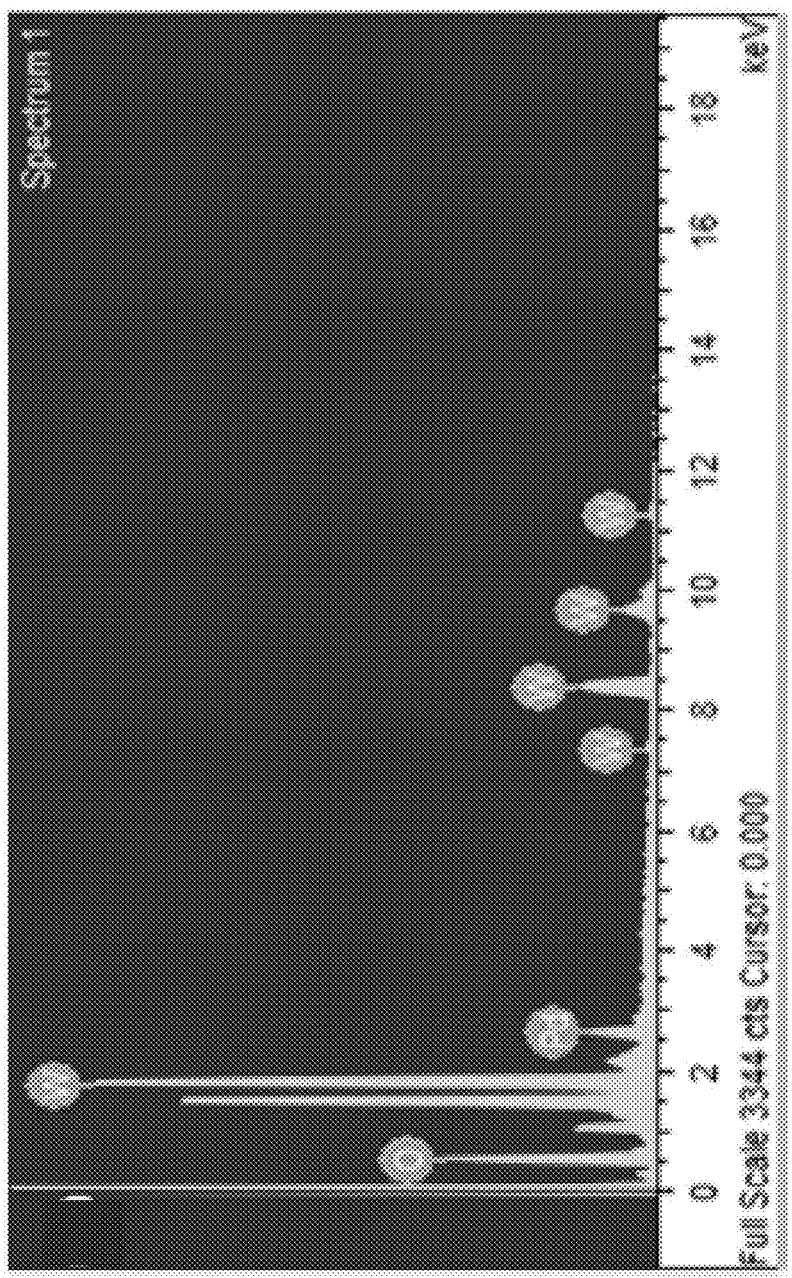
FIG. 5 is a graphical presentation of the EDX spectra of n-Pd/$WO_3$ according to Example 2.

Whether the contacting of the fluid with the photo-catalyst/substrate composite is effected by batch mixing, and/or fixed or fluidized bed reactor, the fluid flow over the photo-catalytic surface of the composite is preferably turbulent to improve mixing and mass transfer rates between the microbial organisms/organic and/or inorganic contaminants and the oxidizing species generated at the photo-catalyst surface. One way to induce a turbulent fluid flow over the photo-catalytic surface of the photo-catalyst/substrate composite is by agitating the fluid while it is contacting the photo-catalyst/substrate composite. Another way is by providing a geometric configuration of the composite to result in such a turbulent fluid flow. An exemplary configuration is a helix axially disposed on a rod as illustrated in FIG. 5 of International Patent Application Publication No. WO2002083570 A1, incorporated herein by reference in its entirety. The purpose of such a geometric configuration or the like is to enhance turbulent flow by creating counter-rotating vortices, cross-current mixing, division and recombination of fluid, and otherwise mixing and agitating the fluid stream.

A mass of the photo-catalyst, or more preferably the photo-catalyst/substrate composite, can be pressed, molded, or packaged into a variety of forms to facilitate photo-catalytic deactivation of the microbial organisms in the fluid and/or removal of the photo-catalyst or the photo-catalyst/substrate composite from the disinfected fluid when the photo-catalytic deactivation is complete, and/or when the photo-catalytic activity of the photo-catalyst is diminished or exhausted. Non-limiting examples of the forms include a granule, a pellet, a sphere, a powder, a woven fabric, a non-woven fabric, a mat, a felt, a block, and a honeycomb.

In some embodiments, the method further comprises removing the photo-catalyst or the photo-catalyst/substrate composite from the disinfected fluid. For example, the photo-catalyst/composite in powder form may be injected into a storage tank of the fluid comprising the microbial organisms and then removed from the disinfected fluid by filtration, centrifugation, or settling. The photo-catalyst/substrate composite in fiber form may be inserted in a section of the fluid (e.g. waste water, a hydrocarbon contaminated liquid) treatment piping or trench, and be removed for recycling or disposal when the disinfection is complete or the photo-catalytic activity of the photo-catalyst has been exhausted.

In another embodiment, the method of disinfecting a fluid may take a form of a continuous and/or multi-stage process. For example, multiple fixed bed columns or reactors of the above mentioned photo-catalyst/substrate composite or, more broadly, multiple disinfection units of any suitable modes or configurations and their combinations, e.g. batch mixing of the photo-catalyst/substrate composite with the fluid accompanied by the simultaneous exposure of the mixture to the light, passing of the fluid through a fixed bed reactor, a cartridge, and/or a fluidized bed reactor of the photo-catalyst/substrate composite accompanied by the simultaneous exposure of the photo-catalyst/substrate composite and the fluid to the light, etc., can be set up to deactivate the microbial organisms in the fluid in a parallel and/or sequential manner. In some embodiments, the disinfection columns, reactors, or units set up in the parallel fashion may be standby columns, reactors, or units ready to replace another set of parallel columns, reactors, or units whose disinfection capacity affected by the photo-catalytic activity of the photo-catalyst and/or other factors has been exhausted to make the disinfection continuous. The photo-catalyst/substrate composite in replaced columns, reactors, or units may be recycled and reused or disposed of. In other embodiments, the disinfection columns, reactors, or units set up in the sequential or serial fashion allow microbial organisms in the fluid to be deactivated through multiple stages to achieve a high disinfection efficiency. Since the disinfection efficiency and/or rate may be affected by the amount of the photo-catalyst per unit volume of the fluid, the multiple disinfection units may preferably contain different amounts of the photo-catalyst or photo-catalyst/substrate composite per unit volume of the fluid such that a preferred amount of the photo-catalyst or the photo-catalyst/substrate composite resulting in the maximum disinfection efficiency and/or rate may be included and determined and further adjustments to amount of the photo-catalyst or the photo-catalyst/substrate composite in the disinfection units may be made accordingly to improve the overall disinfection efficiency and/rate among all the units.

The time during which the fluid contacts the photo-catalyst (or the photo-catalyst/substrate composite) while the fluid and the photo-catalyst (or the photo-catalyst/substrate composite) are exposed to the light may vary, depending on, without limitation, the contacting mode (e.g. batch mixing, fixed bed reactor type, or fluidized reactor type), and the contacting and photo-catalytic deactivation conditions (e.g. the agitation speed, the amount and composition of the photo-catalyst, the power and type of the light source, the distribution and intensity of the light the fluid and the photo-catalyst are exposed to, the type and initial number of the microbial organism in the fluid, and the disinfection efficiency desired).

In some embodiments, the fluid is contacted with the photo-catalyst while the fluid and the photo-catalyst are exposed to the light at a temperature of about 4-100° C., preferably about 10-90° C., preferably about 15-80° C., preferably about 20-70° C., or preferably about 25-60° C., or preferably 30-50° C.

In some embodiments, the fluid is contacted with the photo-catalyst while the fluid and the photo-catalyst are exposed to the light at a pressure of about 0.1-100 bar, about 0.5-80 bar, preferably about 1-60 bar, preferably about 1-40 bar, preferably about 1-20 bar, or preferably about 1-10 bar.

In some embodiments, the disclosed method using the tungsten trioxide nanoparticles doped with the palladium nanoparticles as the photo-catalyst disinfects the fluid, i.e. reduces the number of the at least one live microbial organism in the fluid to a predetermined level, at a rate that is at least 10 times, at least 20 times, at least 30 times, at least 40 times the rate by a substantially similar method with a photo-catalyst comprising non-palladium nanoparticle doped tungsten trioxide nanoparticles, e.g. the precursor tungsten trioxide nanoparticles prior to being doped with the palladium nanoparticles to make the tungsten trioxide nanoparticles (n-WO$_3$) doped with the palladium nanoparticles (n-Pd). The advantageously high photo-catalytic disinfection activity exhibited by the palladium nanoparticle-doped tungsten trioxide nanoparticles as compared to non-palladium nanoparticle-doped tungsten trioxide nanoparticles is unexpected in light of the currently known key factors believed to enhance photo-catalytic activity of a photo-catalyst, particularly band gap energy. For example, in a previous study by M. A. Gondala, A. Bagabasb, A. Dastageera, A. Khalil, Synthesis, characterization, and antimicrobial application of nano-palladium-doped nano-WO$_3$, Journal of Molecular Catalysis A: Chemical 323 (2010) 78-83, incorporated herein by reference in its entirety, a photo-catalyst comprising tungsten trioxide nanoparticles doped with palladium nanoparticles at 10 wt % of the total weight of the tungsten trioxide nanoparticles and the palladium nanoparticles has a higher photo-catalytic activity in disinfection of *E. Coli* in water than a photo-catalyst comprising the non-palladium nanoparticle doped precursor tungsten trioxide nanoparticles, and the increased photo-catalytic activity of the n-Pd doped tungsten trioxide nanoparticles is associated with a higher band gap energy of 3.5 eV relative to the band gap energy of 2.71 eV of the non-n-Pd doped precursor tungsten trioxide nanoparticles. It is believed that the increased band gap energy present in the n-Pd doped tungsten trioxide nanoparticles inhibits electron-hole recombination, resulting in more effective electron-hole pairs for the generation of the oxidizing radicals. In the present disclosure, likely due to a lower loading of the palladium nanoparticles on the tungsten trioxide nanoparticles, i.e. the tungsten trioxide nanoparticles are doped with the palladium nanoparticles at 0.1-5 wt % of the total weight of the tungsten trioxide nanoparticles and the palladium nanoparticles, not only the increase in band gap energy of the n-Pd-doped tungsten trioxide nanoparticles as compared to the band gap energy of the non-n-Pd-doped precursor tungsten trioxide nanoparticles may be much smaller or insignificant, as evidenced by similar peak emission wavelengths in the photoluminescence spectra of the n-Pd-doped tungsten trioxide nanoparticles and the non-n-Pd-doped precursor tungsten trioxide nanoparticles following excitation by a light with a wavelength of 350 nm (See FIG. 9 in the following Example 2 as an example), but also the band gap energy of the n-Pd-doped tungsten trioxide nanoparticles may be unexpectedly lower than that of the non-n-Pd-doped precursor tungsten trioxide nanoparticles (see FIG. 15 in the following Example 3 as an example). In some embodiments, the increase in band gap energy present in the n-Pd doped tungsten trioxide nanoparticles may be less than 20%, less than 10%, less than 5% of the band gap energy of non-n-Pd-doped tungsten trioxide nanoparticles. In other embodiments, the band gap energy of the n-Pd-doped tungsten trioxide nanoparticles may be 70-95%, 75-90%, or 80-85% of the band gap energy of non-n-Pd doped tungsten trioxide nanoparticles. On the other hand, the tungsten trioxide nanoparticles doped with the palladium nanoparticles of the present disclosure have an unexpectedly lower photoluminescence intensity than non-n-Pd doped tungsten trioxide nanoparticles (Also see FIG. 9 in the following Example 2 as an example), indicative of a reduction in electron-hole recombination and thus an increase in effective electron-hole pairs to generate oxidizing radicals. In some embodiments, the photoluminescence intensity of the tungsten trioxide nanoparticles doped with the palladium nanoparticles may be about 10-80%, 20-70%, or about 30-60%, or about 40-50%, of the photoluminescence intensity of non-n-Pd doped tungsten trioxide nanoparticles at a wavelength of 350-550 nm, or 400-500 nm, or 425-475 nm following excitation by a light with a wavelength of 350 nm.

Having generally described this invention, a further understanding can be obtained by reference to certain specific examples which are provided herein for purposes of illustration only and are not intended to be limiting unless otherwise specified.

Example 1

Materials and Methods

1. Synthesis of the Nano Photo-Catalysts

Pure WO$_3$ nanoparticles (n-WO$_3$) were prepared by precipitation method as reported by Supothina et al (See S. Supothina, P. Seeharaj, S. Yoriya and M. Sriyudthsak, Ceram. Int., 2007, 33, 931-936, incorporated herein by reference in its entirety). Briefly, pre-determined amount of ammonium tungstate pentahydrate (($NH_4$)$_{10}$—W$_{12}$O$_{41}$.5H$_2$O) was dissolved in deionized water by heating at 85° C. and this was followed by dropwise addition of warm and concentrated nitric acid (HNO$_3$, Merck) with vigorous stirring. The obtained precipitates, after settling down for 24 hours, were thoroughly washed with deionized water. Finally, the precipitates were filtered by centrifugation, dried and calcined at 500° C. for 6 h at a ramp rate of 1° C. min$^{-1}$. TiO$_2$ nanoparticles (n-TiO$_2$) were synthesized by using decomposition-precipitation technique. Specifically, a titanium (III) sulfate solution (Sigma-Aldrich) was added into hot sulfuric acid. The resultant solution was precipitated by adding excess amount of urea followed by heating at 90° C. The precipitates were thoroughly washed and calcined at 400° C. for 3 h at a ramp rate of 1° C. min$^{-1}$. In the loading process, the prepared n-WO$_3$ nanoparticles were loaded with palladium nanoparticles (n-Pd) by wet incipient technique. A highly concentrated solution of palladium nitrate dihydrate (Pd(NO$_3$)$_2$.2H$_2$O) in deionized water was poured dropwise with a micropipette on the WO$_3$ nanoparticles, and the resultant paste was mixed, dried and calcinated at 400° C. Finally, the obtained product was heated in a programmable furnace for 3 h under a continuous flow of highly pure hydrogen (99.99%) at 350° C. A similar procedure was carried out for loading of n-Pd on the TiO$_2$ nanoparticles.

2. Material Characterization

The crystal structure of the synthesized photo-catalysts was analyzed with a wide angle X-ray diffractometer (Philips X'Pert PRO 3040/60) equipped with a Cu-Kα radiation source in a 2θ=20° to 2θ=90° range. The transmission electron microscopy (TEM) images were recorded with Titan G2 80-300 (FEI Company, Hillsboro, USA), operated at a primary beam energy of 300 keV, while a point-to-point analysis was performed at the same beam energy with a step of 0.235 nm. Elemental analysis was performed to confirm the palladium loading using energy dispersive analyzer unit (EDAX) coupled with field emission scanning electron microscopy (FE-SEM, TESCAN FERA3). A charge coupled device (CCD) camera (US4000, Gatan, Inc., Pleasanton, Calif.) was used to record digital images. A JASCO, V-670, UV-vis-NIR spectrophotometer was used for recording the solid-state absorption and diffused reflectance spectra (DRS) of the synthesized photo-catalysts using BaSO$_4$ pellet as a reference. The photoluminescence spectra were recorded using Shimadzu spectrofluorometer with 1200 grooves per mm.

3. Photo-Catalytic Reaction Studies

The reaction cell had two 2-inch diameter quartz windows that let the laser beam in and out of the sample and at the same time withstood high energy laser pulse. The emerging laser beam was blocked with a laser beam block. The different photo-catalyst concentration was maintained by adding different amounts of the photo-catalyst in the sulfate-reducing bacteria (SRB) infected water and the reaction cell was kept on a magnetic stirrer which kept the photo-catalyst homogeneously dispersed in the infected water. A high power laser beam with a wavelength of 355 nm and a pulse width of about 8 ns generated from the third harmonic of the Spectra Physics Nd:YAG laser (Model GCR 250) was employed as a radiation source. The destructive effects of the focused laser beam were minimized and the maximum interaction between the photons and the semiconductor material (i.e. the photo-catalyst) was ensured by expanding the diameter of the beam to 2 cm with a set of lenses and mirrors. An aliquot of the laser irradiated sample was collected at a regular interval for bacteria counting.

4. Culturing and Counting of Bacteria

ATCC 1249 medium, modified Baar's medium for sulfate reducers component was prepared and used for the growth of SRB. The medium was autoclaved and the nitrogen gas was bubbled through the medium for about 30 minutes to remove the dissolved oxygen in the medium. The medium was transferred to anaerobic chamber with a clean nitrogen environment where inoculation took place. After distributing the medium to the flasks with the desired volume of 100 ml per flask, each flask was inoculated with SRB broth from a one-week old culture. The inoculum to medium volume ratio was 1%. After the SRB containing medium in the flask was incubated at 30° C. for 7 days, 80 ml of the SRB containing medium with or without a photo-catalyst was irradiated by exposing the medium to the laser radiation with the wavelength of 355 nm and with 40 mJ per pulse energy. A 1-ml aliquot of the irradiated medium was transferred to a new sterile tube at a regular interval. The medium in the new sterile tube collected at each time point was serially diluted, and 100 μl of each diluted sample was directly plated on an agar plate (in duplicates) for SRB colony formation followed by incubation for 7 days at 30° C. After the incubation, the plate was observed under a colony counter and the number of colonies was visually recorded (See J. Wen, D. Xu, T. Gu and I. Raad, World J. Microbiol. Biotechnol., 2012, 28, 431-435; E. A. Ghazy, M. G. Mahmoud, M. S. Asker, M. N. Mahmoud, M. M. Abo Elsoud and M. E. Abdel Sami, Water, Am. J. Sci., 2011, 7, 604-608; each incorporated herein by reference in its entirety).

Example 2

Characterization of the Photo-Catalysts

1. Morphological Characterization of the Photo-Catalysts

Figure 2:
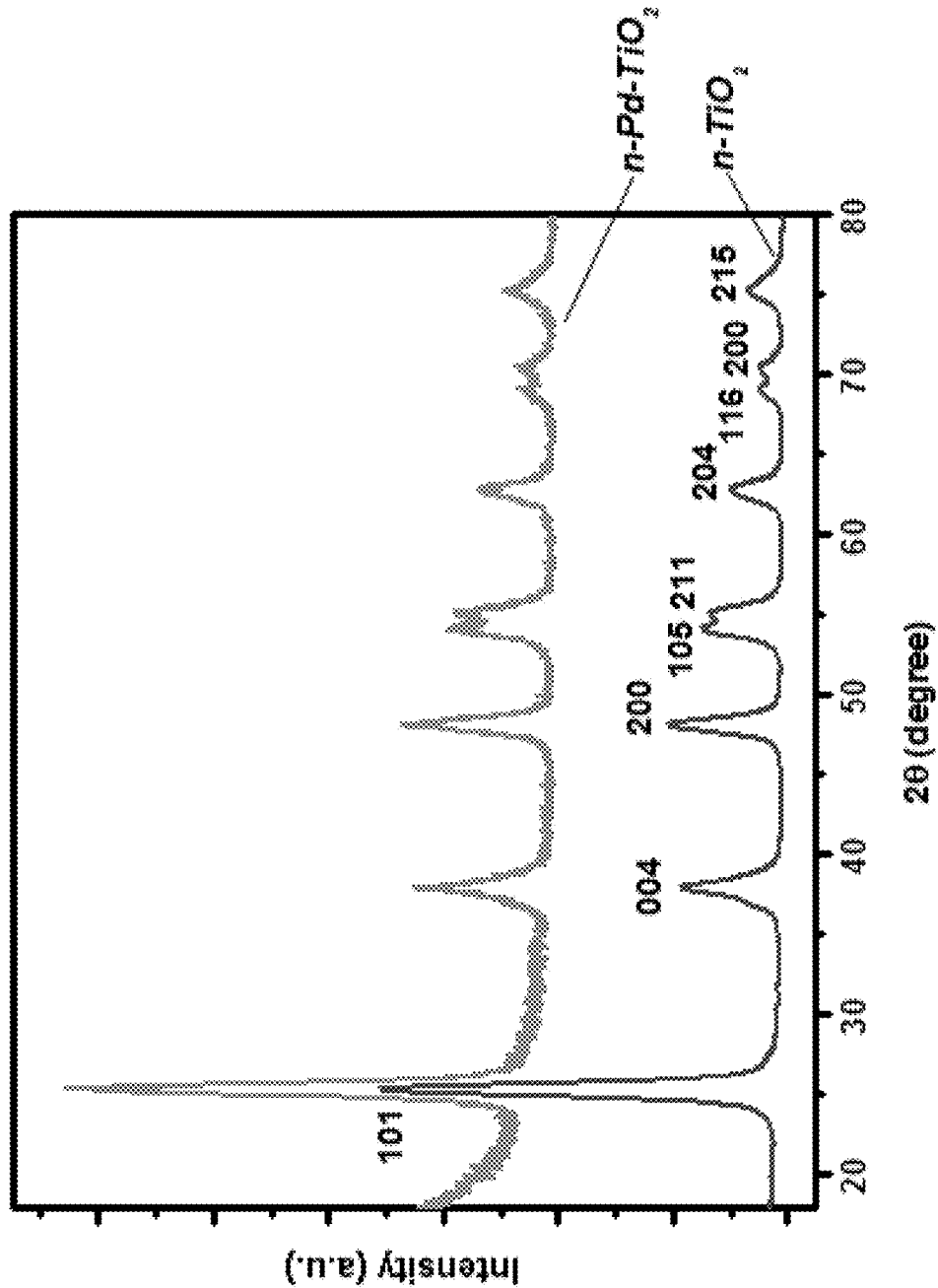
FIG. 2 is a graphical presentation of the XRD patterns of n-$TiO_2$ and n-Pd/$TiO_2$ according to Example 2.
Figure 3:
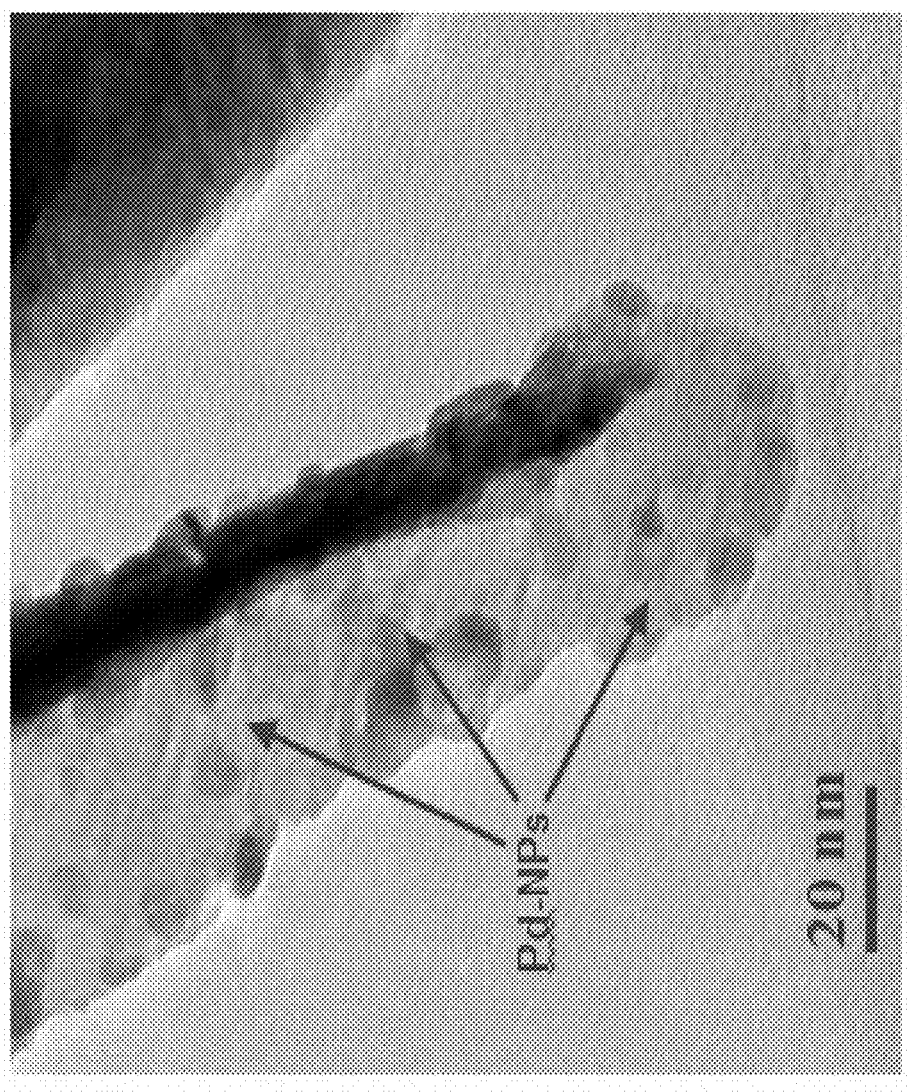
FIG. 3 is a TEM image of n-Pd/$WO_3$ according to Example 2.
Figure 4:
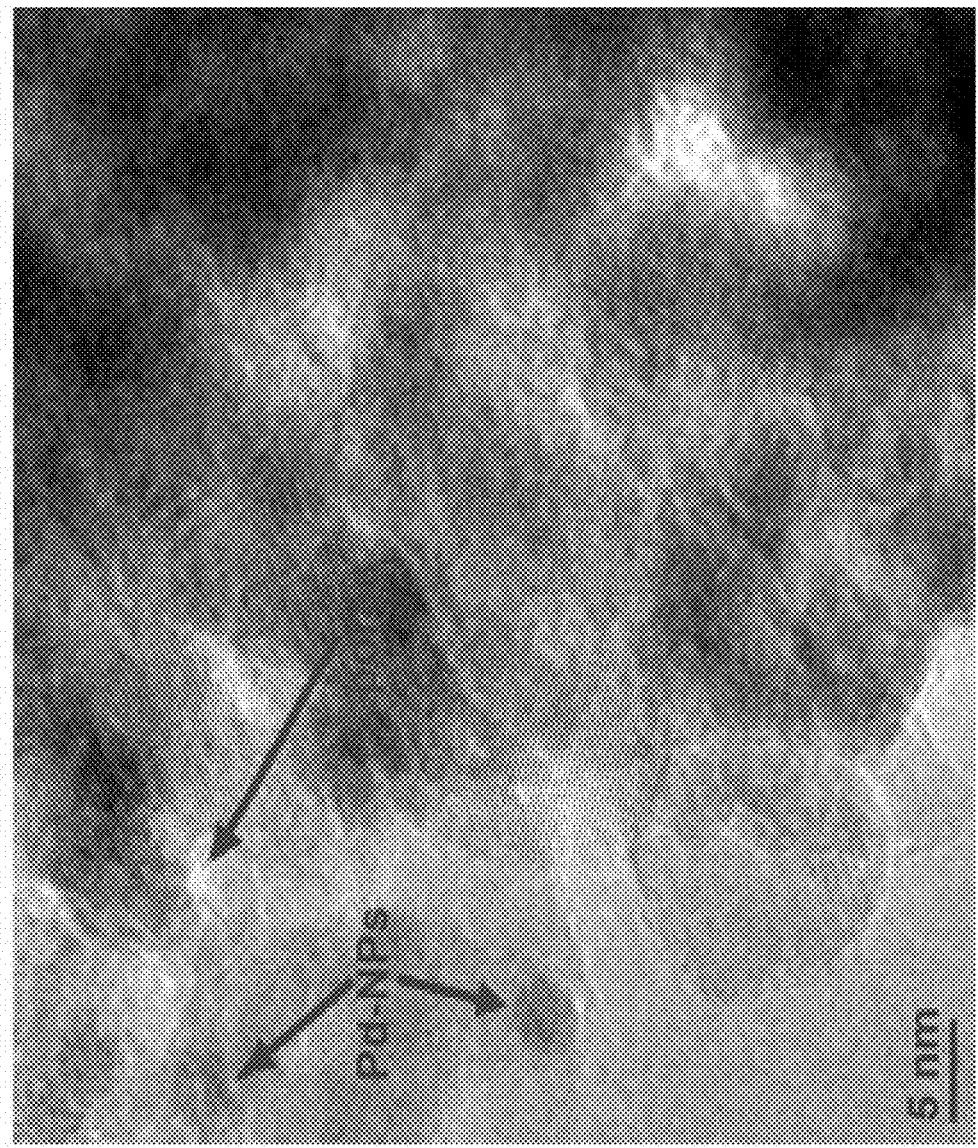
FIG. 4 is a TEM image of n-Pd/$TiO_2$ according to Example 2.
Figure 6:
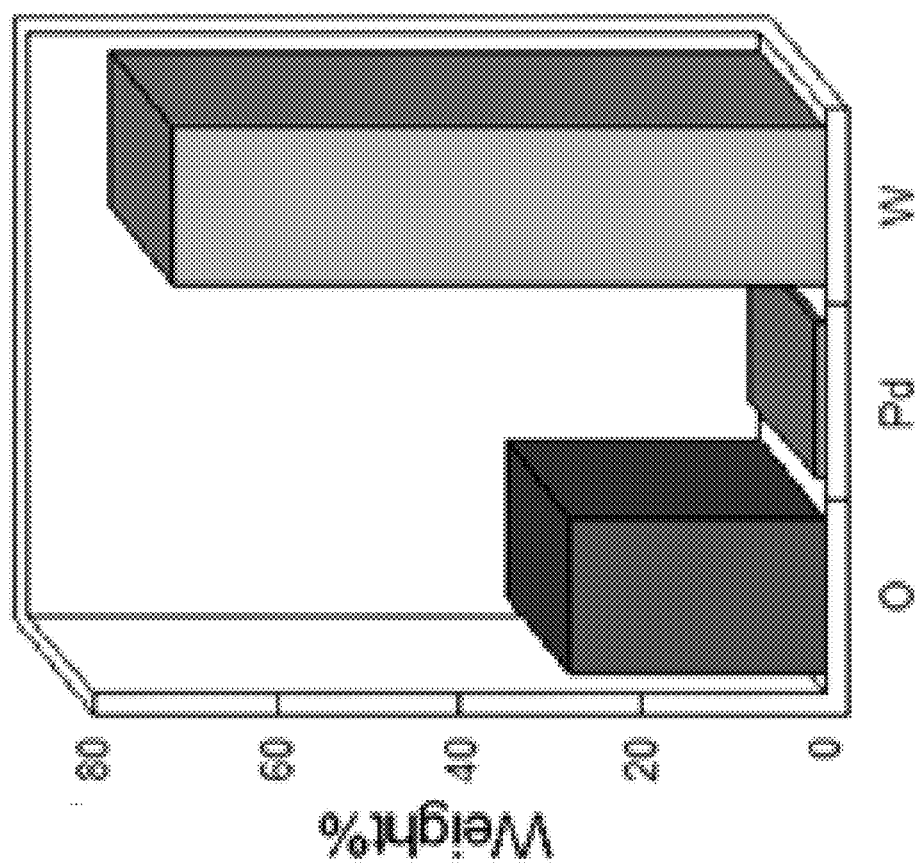
FIG. 6 is a graphical presentation showing the weight percentage of O, Pd, and W in n-Pd/$WO_3$ according to Example 2.

The XRD patterns for the synthesized n-WO$_3$ and n-Pd/WO$_3$ are presented in FIG. 1. All the main indexed peaks were fitted to the hexagonal WO$_3$ system (JCPDS card 35-1001). Higher diffraction coming from [001] compared with other planes suggests that [001] is the major growth direction. After n-Pd loading on n-WO$_3$, no change in XRD pattern was noticed, indicating the material is of a single phase and is impurity free. The Pd diffraction not appearing in the XRD pattern could be due to a high dispersion and a low loading (around 1 wt %) of Pd nanoparticles on the n-WO$_3$. However, the crystallinity of n-Pd/WO$_3$ was reduced probably due to the dispersed palladium covering n-WO$_3$. The XRD patterns of n-TiO$_2$ and n-Pd/TiO$_2$ are presented in FIG. 2. All the peaks can be indexed to anatase phase of TiO$_2$, and the [101] is the major growth zone. After n-Pd loading, no extra peak was noticed probably due to the low loading of n-Pd (around 1 wt %) and a high dispersion of n-Pd on the surface of n-TiO$_2$. TEM analysis of n-Pd/WO$_3$ revealed that the WO$_3$ nanoparticles had an average particle size of 60-100 nm and had plate and cylindrical like morphologies, and that the palladium nanoparticles (n-Pd) with an average particle size of 4-17 nm were anchored on the WO$_3$ nanoparticles as shown in FIG. 3. The TiO$_2$ nanoparticles were quasi-spherical and had an average particle size of 20-30 nm, and the palladium nanoparticles with spheroid morphologies were dispersed on the surface of the TiO$_2$ nanoparticles as shown in FIG. 4. Referring to FIG. 5 and FIG. 6 for the energy-dispersive X-ray spectroscopy (EDX) spectrum and quantitative results of n-Pd/WO$_3$, respectively, the n-Pd/WO$_3$ contained Pd in addition to W and O, confirming that the surface of the WO$_3$ nanoparticles was successfully loaded with n-Pd.

2. Optical Characterization of the Photo-Catalysts

The optical properties of n-WO$_3$ and n-Pd/WO$_3$, n-TiO$_2$ and n-Pd/TiO$_2$ were estimated by applying Kubelka-Munk transformation on the reflectance data acquired by diffuse reflectance spectroscopy. The optical absorbance in terms of Kubelka-Munk function is estimated using the following equation:

$$F(R) = \frac{(1-R)^2}{2(R)} \quad (1)$$

where R is the diffuse reflectance. Two opposing changes in the absorption curves brought about by the n-Pd loading were observed from FIG. 7 and FIG. 8: (i) enhanced visible light absorption and (ii) a slight blue shift in the absorption edge (i.e. the wavelength at which the onset of absorption occurred) following the loading of n-Pd on n-TiO$_2$ and n-WO$_3$. The enhancement of the visible light absorption is attributed to the surface plasmon absorption of larger palladium nanoparticles and clusters, while the blue shift in the absorption edge could be the result of smaller Pd nanoparticles (about 6 nm) absorbing light in the UV region (See K. Hayat, M. A. Gondal, M. M. Khaled, Z. H. Yamani and S. Ahmed, J. Hazard. Mater., 2011, 186, 1226-1233, incorporated herein by reference in its entirety). Photoluminescence (PL) spectra of both n-WO$_3$ and n-Pd/WO$_3$ are shown in FIG. 9, where there is a substantial reduction in PL intensity upon the n-Pd loading on n-WO$_3$, indicating a reduction of electron-hole pair recombination brought about by the n-Pd loading on the WO$_3$ nanoparticles.

Example 3

Figure 10:
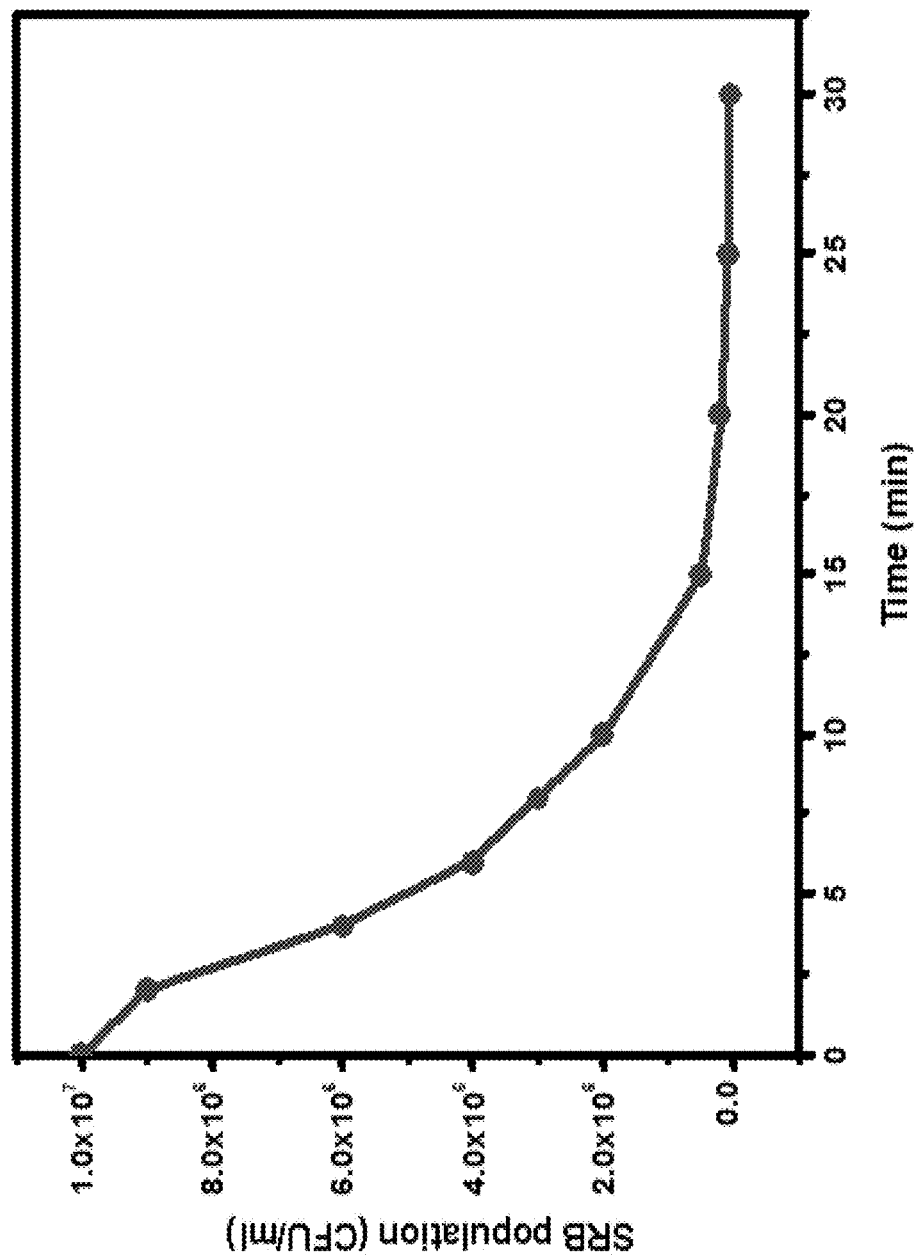
FIG. 10 is a graphical presentation showing the exponential decay of SRB in water by a laser radiation at 355 nm in wavelength and with 40 mJ per pulse energy in the presence of 1.5 mg/ml of n-Pd/$WO_3$ according to Example 3.
Figure 11:
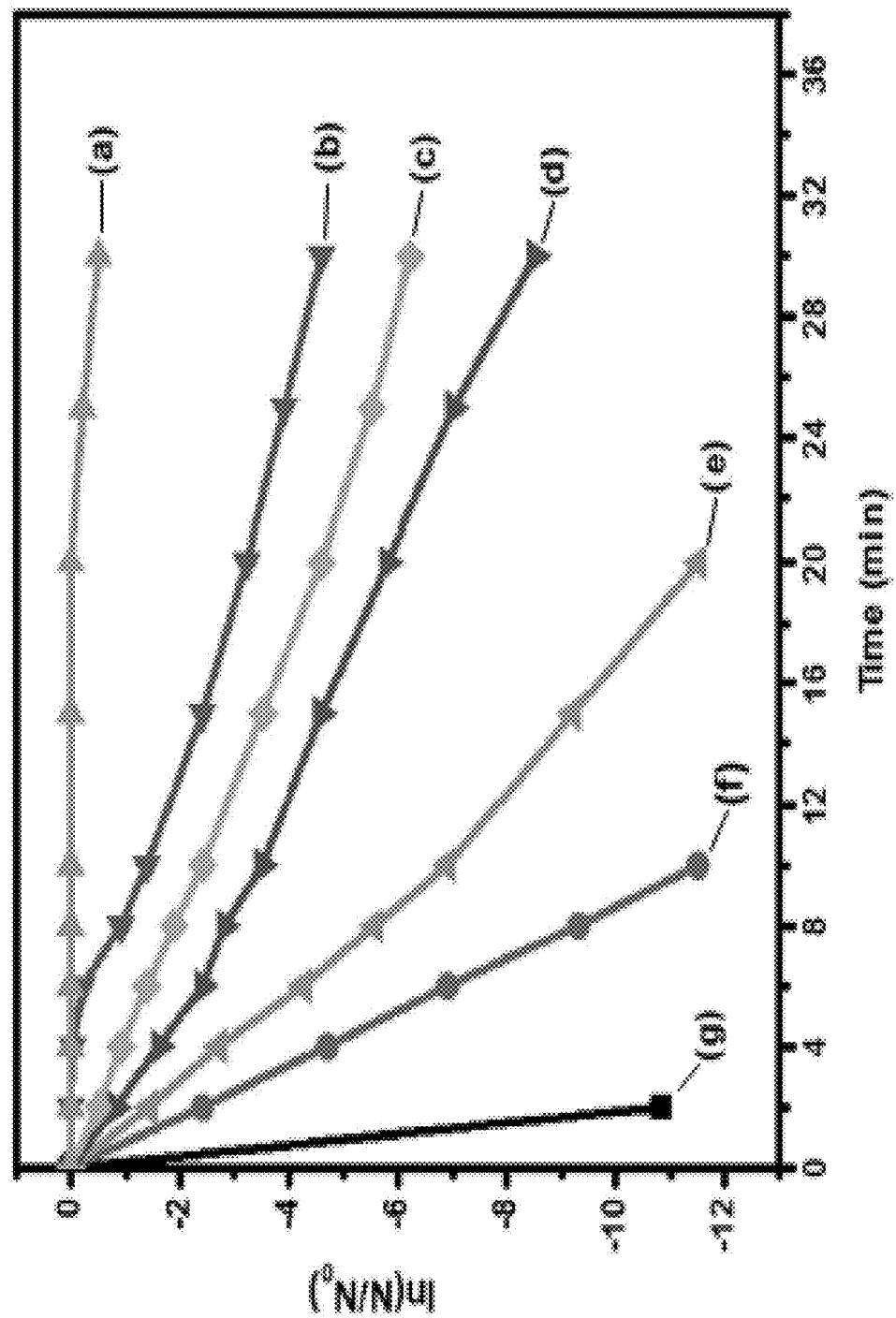
FIG. 11 is a graphical presentation showing photocatalytic deactivation of SRB in water by a laser radiation at 355 nm in wavelength and with 40 mJ per pulse energy in the presence of (a) no photo-catalyst (b) 1.5 mg/ml of pure n-$WO_3$ (c) 0.5 mg/ml of n-Pd/$WO_3$ (d) 3.0 mg/ml of n-Pd/$WO_3$ (e) 2.0 mg/ml of n-Pd/$WO_3$ (f) 1.0 mg/ml of n-Pd/$WO_3$ or (g) 1.5 mg/ml of n-Pd/$WO_3$ according to Example 3.
Figure 12:
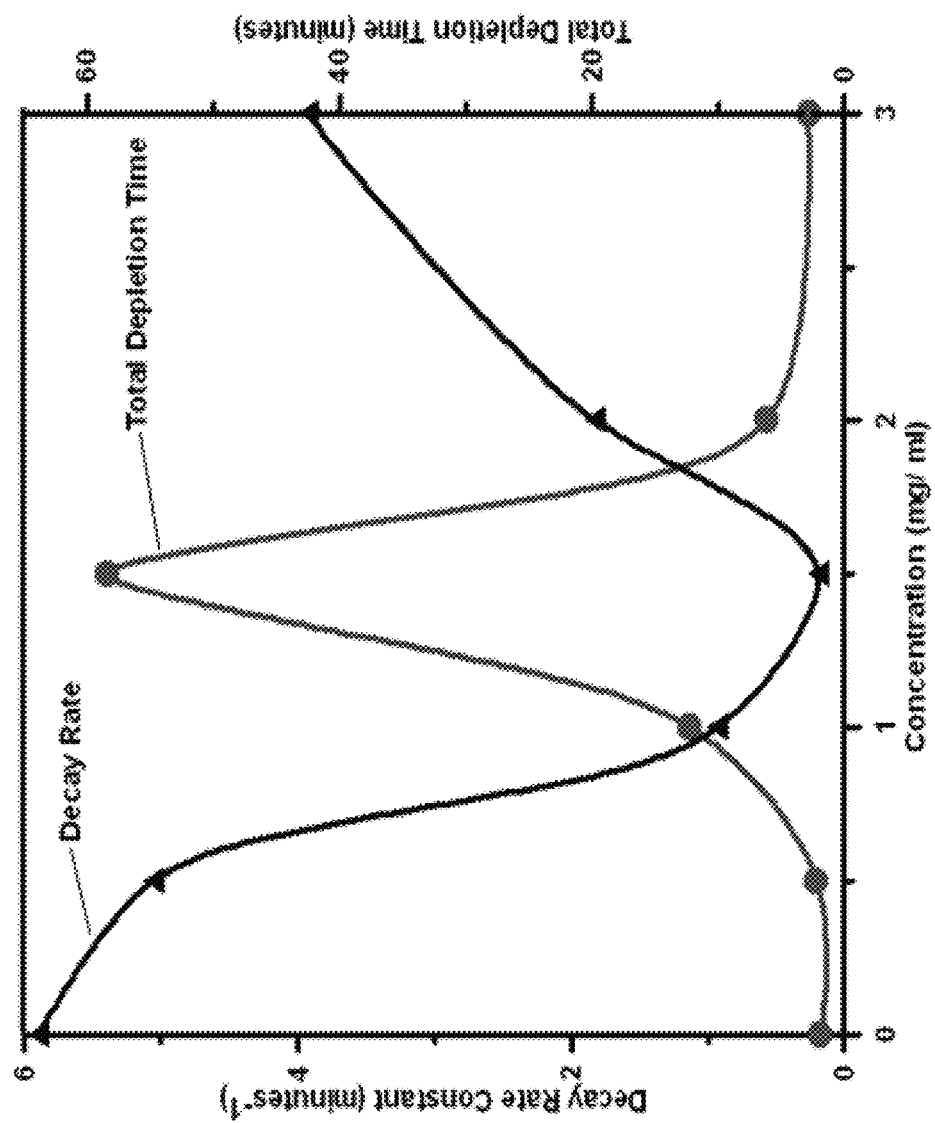
FIG. 12 is a graphical presentation showing the dependence of the SRB decay rate constant and total depletion time on the concentration of n-Pd/$WO_3$ in the SRB contaminated water according to Example 3.

Photocatalytic Deactivation of SRB Using the n-WO$_3$, n-Pd/WO$_3$, n-TiO$_2$, and n-Pd/TiO$_2$ Photo-Catalyst FIG. 10 is a typical exponential decay curve of SRB representing the fastest SRB deactivation process obtained while using 1.5 mg/ml of n-Pd/WO$_3$ with a laser radiation at 355 nm in wavelength and at 40 mJ per pulse energy. The rate of deactivation of SRB was conveniently quantified in terms of the decay rate constant k (i.e. the slope of the linear lnN/N$_0$ versus time plot, where N is the number of SRB at time t and N$_0$ is the initial number of SRB) in the units of minute$^{-1}$ and the total depletion time t$_d$ (time required for the complete depletion) in the units of minutes. FIG. 11 indicates that the rate of SRB deactivation depended on the n-Pd/WO$_3$ concentrations. Specifically, the decay rate constant initially increased with the increasing concentration of n-Pd/WO$_3$, reached the maximum when the concentration of n-Pd/WO$_3$ was at 1.5 mg/ml, and started to decline when the concentration of n-Pd/WO$_3$ was further increased to 2 mg/ml and to 3 mg/ml. For all the decay curves in the present disclosure, the laser radiation at 355 nm in wavelength and with the pulse energy of 40 mJ was used. The initial SRB count (N$_0$) was fixed to be 4×10$^7$ counts per ml, and any SRB count below 150 counts per ml (corresponding to a value equal to −11.5 on the ordinate axes) was taken as complete depletion. Referring to FIG. 11, when the SRB depletion curves obtained with no photo-catalyst represented by line (a), with 1.5 mg/ml of pure n-WO$_3$ represented by line (b), and with 1.5 mg/ml of n-Pd/WO$_3$ represented by line (g) were compared, the decay rate constant increased from nearly zero with no photo-catalyst to 0.18 minute$^{-1}$ with 1.5 mg/ml of pure n-WO$_3$ and to the maximum of 5.4 minute$^{-1}$ with 1.5 mg/ml of n-Pd/WO$_3$. Additionally, the decay rate constant with n-Pd/WO$_3$ as the photo-catalyst at every concentration tested was more than that with 1.5 mg/ml of pure n-WO$_3$ as the photo-catalyst. The increased decay rate constant with n-Pd/WO$_3$ may be attributed to the increased optical absorption following the n-Pd loading depicted in FIG. 7. As the decay rate constant increased, the time required for the total depletion decreased. For example, in the presence of 1.5 mg/ml of pure n-WO$_3$, it would take 64 minutes for the total depletion of SRB from the contaminated water, whereas it would take just 2 minutes for the total depletion of SRB from the contaminated water with 1.5 mg/ml of n-Pd/WO$_3$, indicating an advantageous enhancement of the photo-catalytic SRB deactivation with n-Pd/WO$_3$. FIG. 12 shows the trends of both the SRB decay rate constant (k) and the total depletion time (t$_d$) with the concentration of n-Pd/WO$_3$ in the SRB contaminated water.

Figure 13:
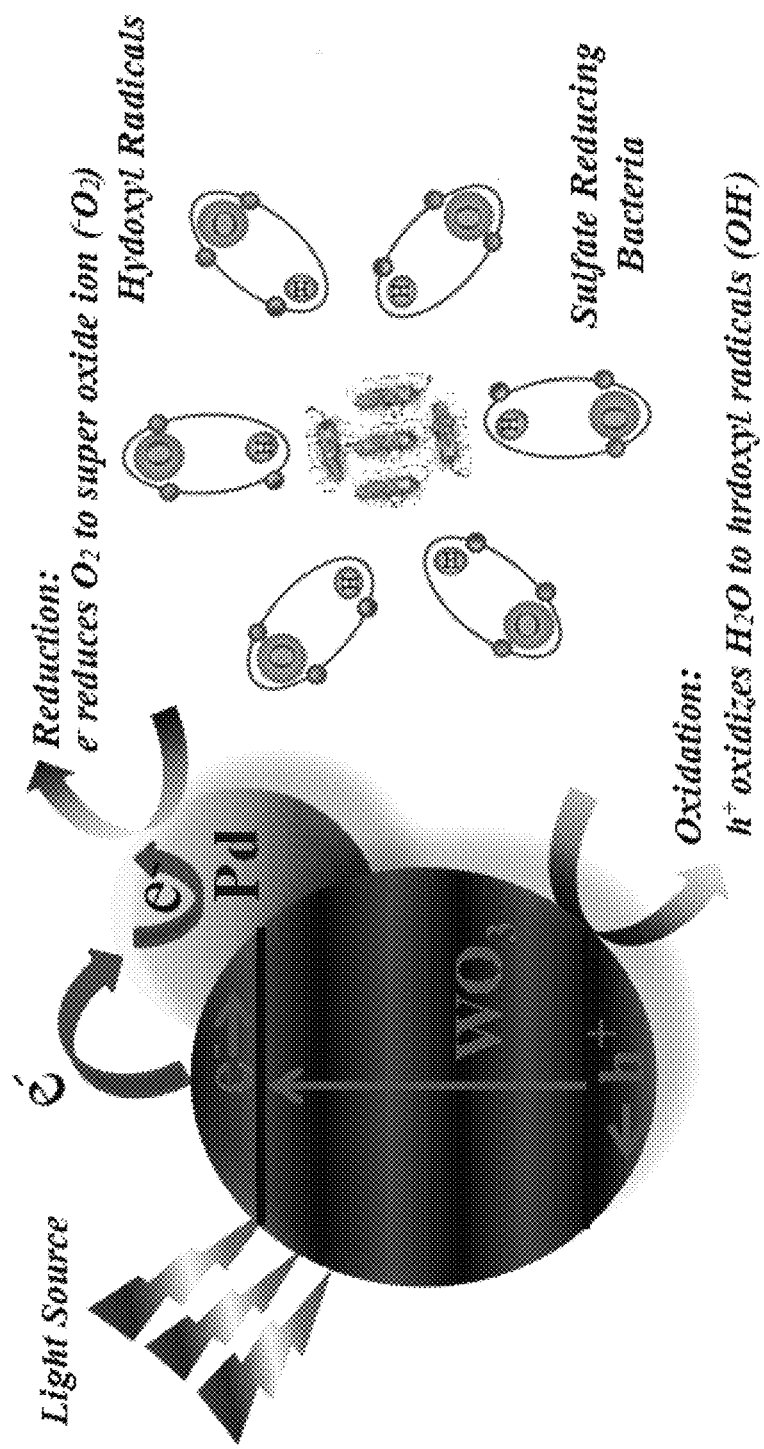
FIG. 13 is an illustration of the photocatalytic deactivation of SRB according to Example 3.

With an increase in photon absorption of the catalytic material, a photo-catalyst may generate more electron-hole pairs that move to the surface of the photo-catalyst particle to form highly oxidizing radicals, such as hydroxyl radicals and superoxide radicals, which effectively oxidize the cell membrane and damage the microbial organisms (See Y. Xiong, J. Chen, B. Wiley, Y. Xia, Y. Yin and Z. Y. Li, Nano Lett., 2005, 5, 1237-1242, incorporated herein by reference in its entirety). FIG. 13 depicts the proposed mechanism of the photo-catalytic deactivation of SRB. The hydroxyl radicals may generate oxygen while H$^+$ ions may form hydrogen by capturing the conduction band electrons. The superoxide radicals and hydroxyl radicals generated through the laser induced photocatalysis process killed the bacteria in contaminated water. This deactivation process of bacteria is effective as long as the cell membrane of the bacteria is exposed to the superoxide and hydroxyl radicals. When the concentration of the photo-catalyst increases beyond a certain level, the photo-catalyst particles may mask the bacterial surface, preventing the radicals from effectively oxidizing the bacterial cell membrane. In a photocatalysis process, the electron-hole pairs generated are prone to recombination and any technique inhibiting the recombination can make more electron-hole pairs available for the photocatalytic reaction. The reduced photoluminescence signal exhibited by n-Pd/WO$_3$ as compared to pure n-WO$_3$ indicates a substantial reduction in electron-hole recombination in n-Pd/WO$_3$, resulting in more effective electron-hole pairs available for the deactivation process of SRB.

Figure 14:
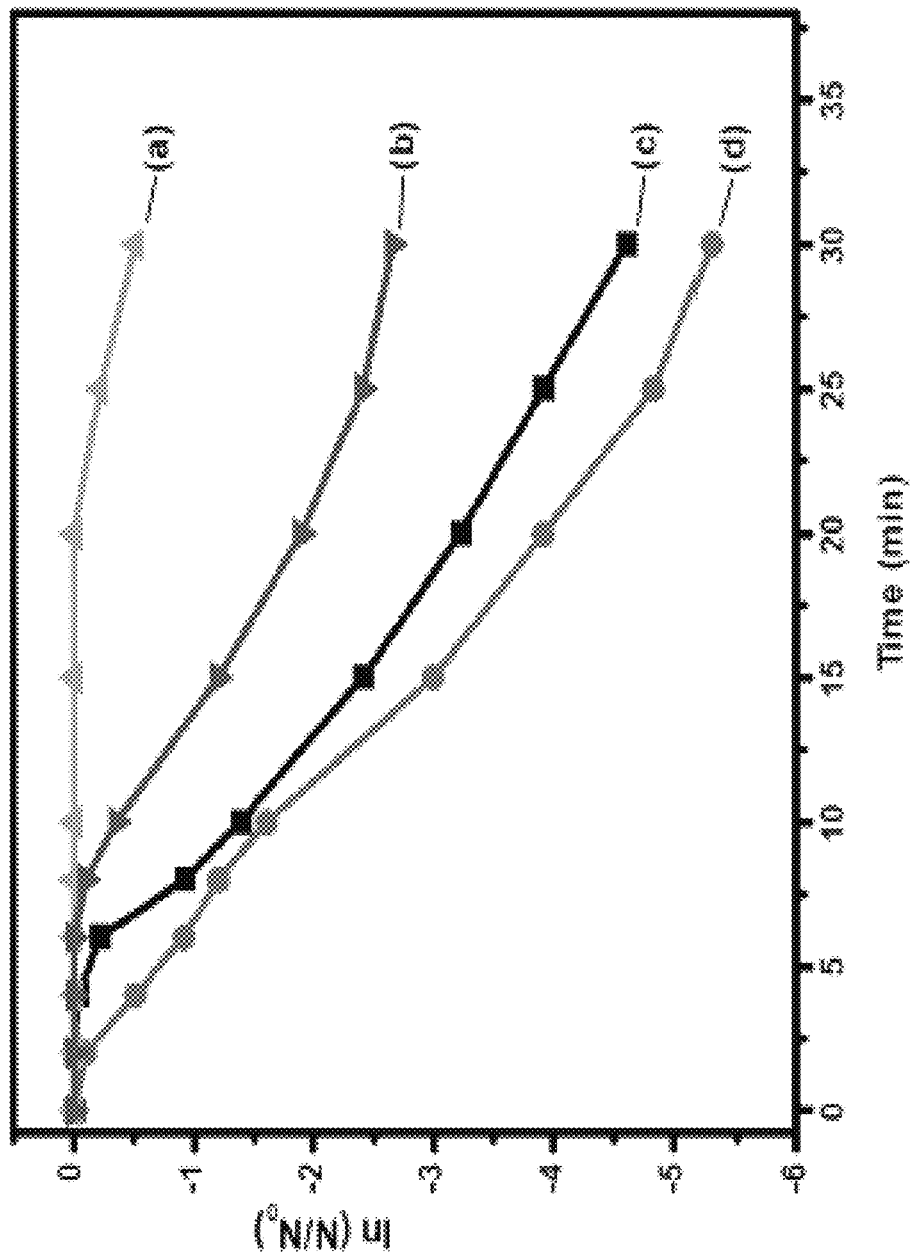
FIG. 14 is a graphical presentation showing photocatalytic deactivation of SRB in water by a laser radiation at 355 nm in wavelength and with 40 mJ per pulse energy in the presence of (a) no photo-catalyst (b) 1.5 mg/ml of n-Pd/$TiO_2$ (c) 1.5 mg/ml of pure n-$WO_3$ or (d) 1.5 mg/ml of pure n-$TiO_2$ according to Example 3.

For comparison, the SRB decay curves were obtained with 1.5 mg/ml of n-Pd/TiO$_2$ and 1.5 mg/ml of pure n-TiO$_2$ as well as with no photo-catalyst and with 1.5 mg/ml of pure n-WO$_3$ as shown in FIG. 14. A comparison of the SRB decay curve with pure n-TiO$_2$ to that with n-Pd/TiO$_2$ indicates that the n-Pd loading on n-TiO$_2$ resulted in a reduction in the bacterial decay rate constant from 0.2 minute$^{-1}$ to 0.12 minute$^{-1}$ rather than an improvement in the photo-catalytic activity, in contrast to the n-Pd loading on n-WO$_3$. Further, although n-TiO$_2$ was a better photo-catalyst than n-WO$_3$ for SRB deactivation, the n-Pd loading on n-TiO$_2$ inhibited the photo-catalytic deactivation activity of n-TiO$_2$, whereas the n-Pd loading on n-WO$_3$ substantially enhanced the photo-catalytic deactivation activity of n-WO$_3$ shown in FIG. 11.

Figure 15:
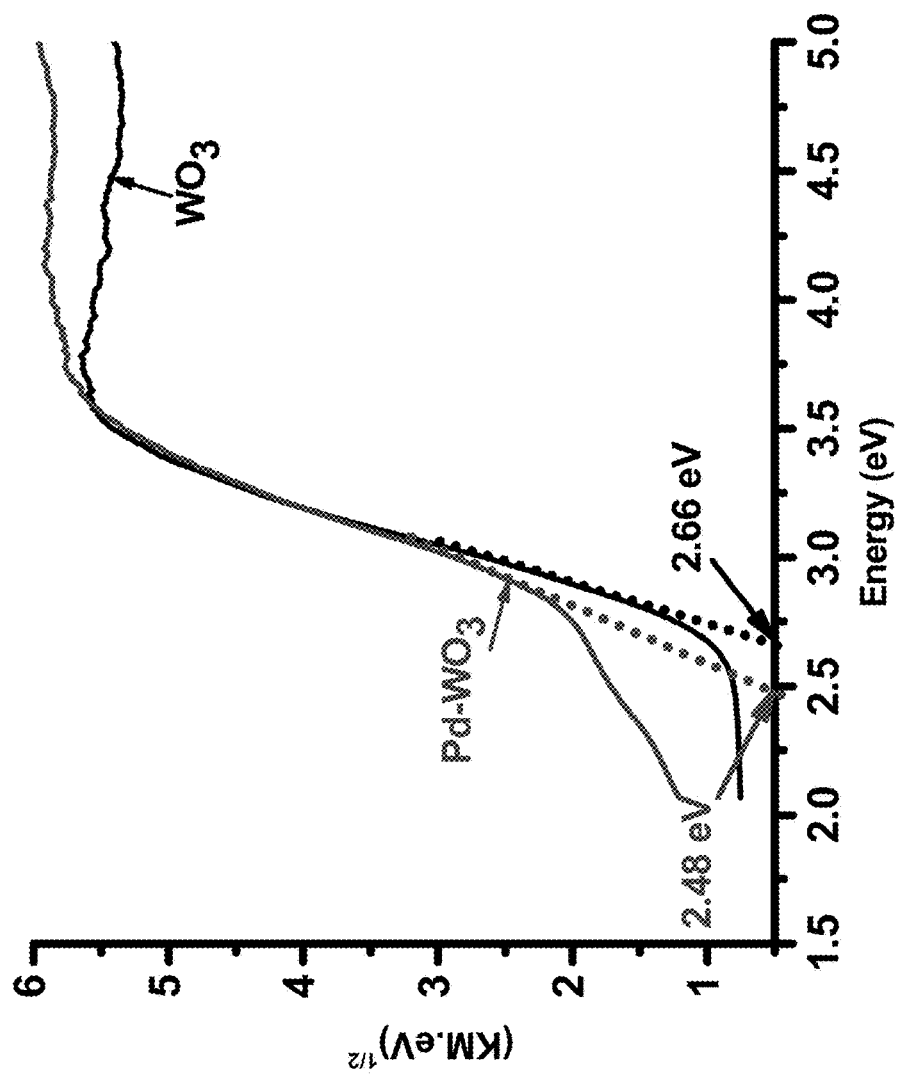
FIG. 15 is a plot of the square root of Kubelka-Munk function multiplied with energy $(KM \cdot eV)^{1/2}$ versus energy showing the band gap energy of 2.48 eV for n-Pd/$WO_3$ and the band gap energy of 2.66 eV for pure n-$WO_3$.

The results above indicate that the mere presence of Pd in a photo-catalyst would not necessarily increase photo-catalytic deactivation of SRB. To effect increased photo-catalytic deactivation of SRB, the n-Pd loading on a photo-catalyst needs to result in a change in the structure of the band gap that enables the increased light absorption and decreased electron-hole recombination. Referring to FIG. 15, the band gap energy of n-Pd/WO$_3$ and pure n-WO$_3$ was determined by plotting the square root of Kubelka-Munk function multiplied with energy (KM·eV)$^{1/2}$ versus energy. The band gap energy of n-Pd/WO$_3$ was 2.48 eV, which was unexpectedly lower than the band gap energy of 2.66 eV for pure n-WO$_3$. The lower band gap energy of n-Pd/WO$_3$ relative to that of pure n-$WO_3$ would not have predicted the increased photo-catalytic deactivation activity of n-Pd/$WO_3$ relative to pure n-$WO_3$ based on, for example, the publication of M. A. Gondala, A. Bagabasb, A. Dastageera, A. Khalil, Synthesis, characterization, and antimicrobial application of nano-palladium-doped nano-$WO_3$, Journal of Molecular Catalysis A: Chemical 323 (2010) 78-83, described previously in the present disclosure.

The SRB decay rate constants k and the depletion time $t_d$ for different photo-catalysts and at different concentrations of the photo-catalysts are shown in Table 1. Table 1 also shows the threshold time, which is defined as the time taken after excitation for the onset of photo-deactivation of SRB. For the SRB deactivation with n-Pd/$WO_3$ at different concentrations, the threshold times were instant, whereas the threshold times were 20 minutes with no photo-catalyst present, 6 minutes with pure n-$WO_3$, 8 minutes with n-Pd/$TiO_2$, and 2 minutes with pure n-$TiO_2$.

TABLE 1

Catalytic performance indicators for the disinfection of SRB in contaminated water

| Catalyst | Catalyst concentration (mg ml$^{-1}$) | Decay rate constant (k) (min$^{-1}$) | Total depletion time (minutes) | Threshold time (minutes) |
|---|---|---|---|---|
| No catalyst | N/A | 0.05 | 220 | 20 |
| Pure n-$WO_3$ | 1.5 | 0.18 | 64 | 6 |
| n-Pd/$WO_3$ | 0.5 | 0.21 | 55 | Instant |
| n-Pd/$WO_3$ | 1 | 1.14 | 10 | Instant |
| n-Pd/$WO_3$ | 1.5 | 5.40 | 2 | Instant |
| n-Pd/$WO_3$ | 2 | 0.58 | 20 | Instant |
| n-Pd/$WO_3$ | 3 | 0.27 | 43 | Instant |
| Pure n-$TiO_2$ | 1.5 | 0.20 | 58 | 2 |
| n-Pd/$TiO_2$ | 1.5 | 0.12 | 92 | 8 |

Figure 7:
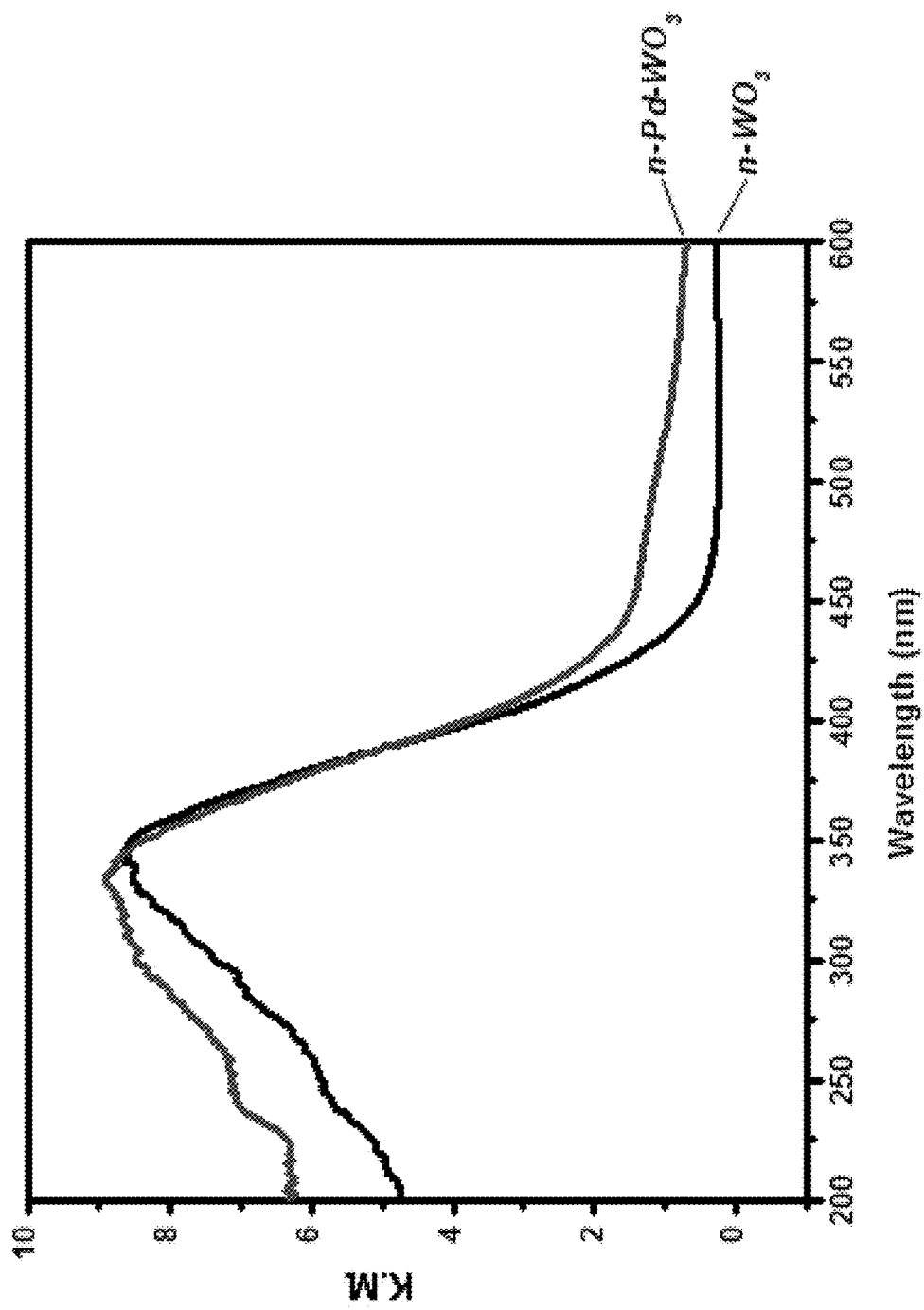
FIG. 7 is a graphical presentation of the optical absorptivity of n-$WO_3$ and n-Pd/$WO_3$ in terms of Kubelka-Munk function according to Example 2.
Figure 8:
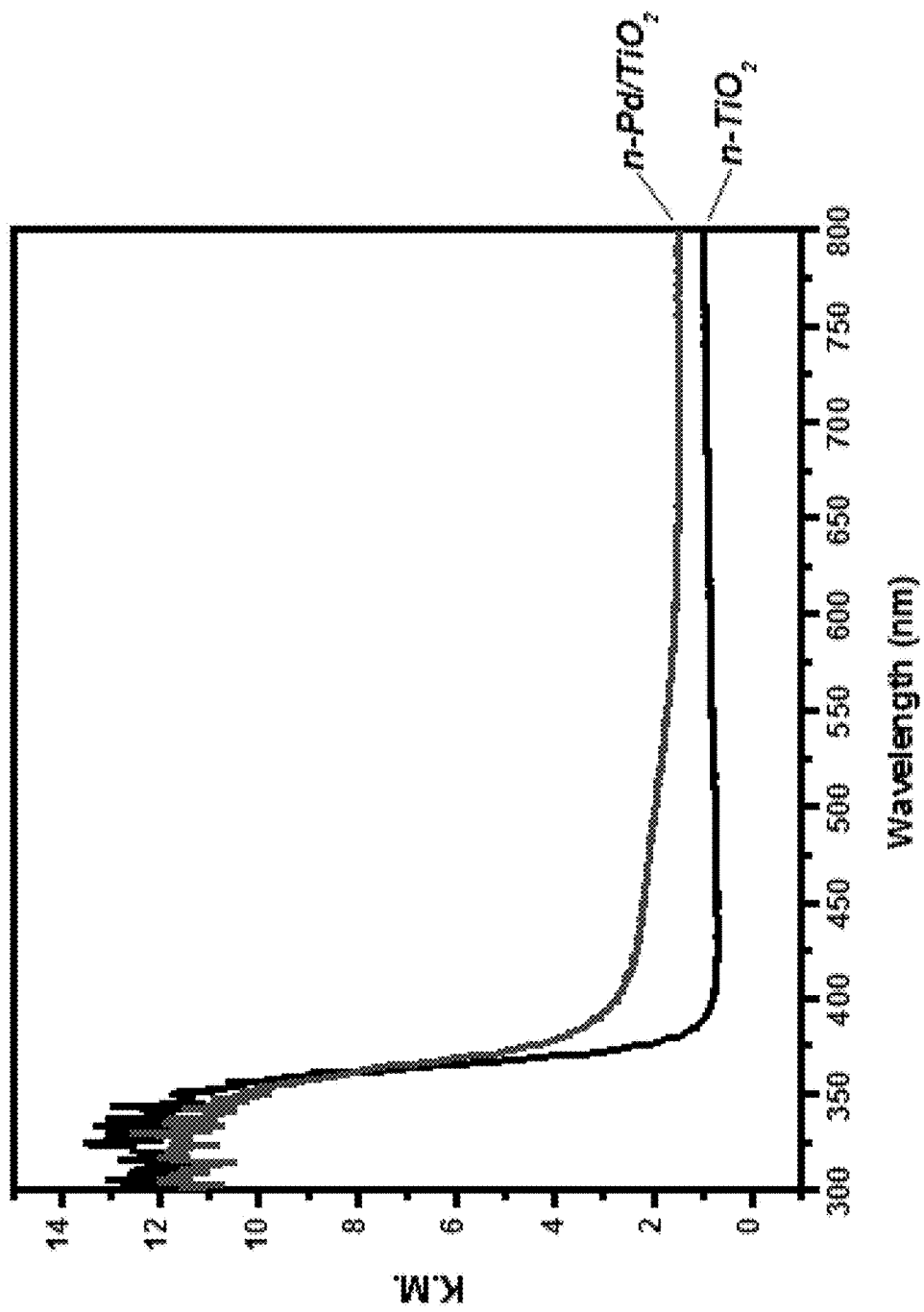
FIG. 8 is a graphical presentation of the optical absorptivity of n-$TiO_2$ and n-Pd/$TiO_2$ in terms of Kubelka-Munk function according to Example 2.
Figure 9:
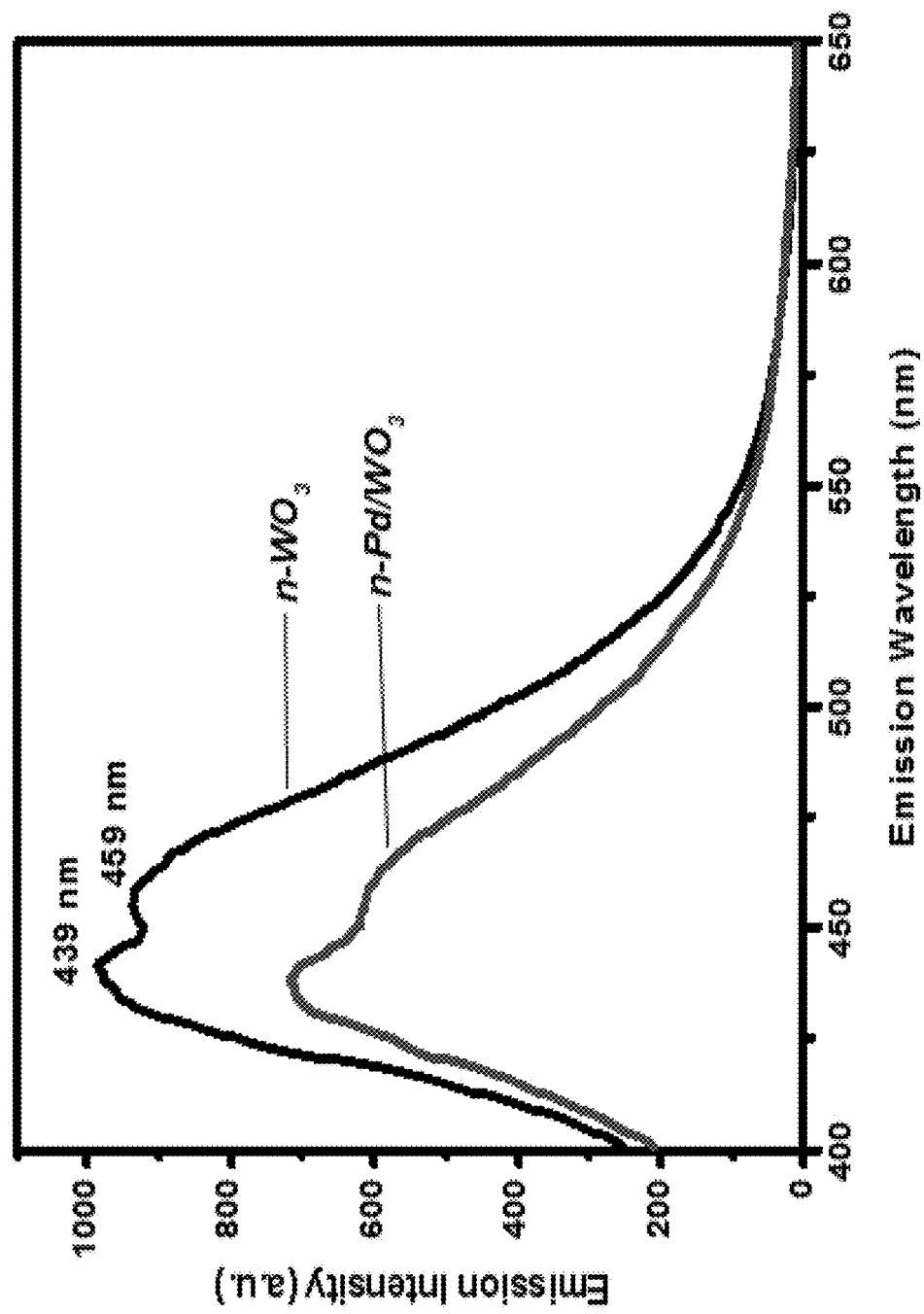
FIG. 9 is a graphical presentation of the photoluminescence spectrum of n-$WO_3$ and n-Pd/$WO_3$ excited by a light with a wavelength of 350 nm according to Example 2.

In light of the differences in the photo-catalytic activity for SRB deactivation between n-Pd/$WO_3$ and n-$WO_3$, between n-Pd/$TiO_2$ and n-$TiO_2$, and between n-Pd/$WO_3$ and n-Pd/$TiO_2$, as represented by their decay rate constants listed in Table 1, it appears that the slight blue shift in the absorption edge, probably due to the absorption of smaller Pd nanoparticles, and the enhancement of the visible light absorption, probably due to the surface plasmon absorption or resonance of larger Pd nanoparticles and clusters, that were seen in both n-Pd/$WO_3$ and n-Pd/$TiO_2$ relative to their respective non-n-Pd doped n-$WO_3$ and n-$TiO_2$ as shown in FIG. 7 and FIG. 8, may not or may only partially account for the increased photo-catalytic activity of n-Pd/$WO_3$ relative to n-$WO_3$. It is well known that the surface plasmon resonance is a process involving a crucial interplay between concerted oscillations of free electrons trapped on the surface of a photo-catalyst and the electromagnetic waves and very sensitive to the size, shape, composition and arrangement of a metallic nanostructure (See T. Y. Leung, C. Y. Chan, C. Hu, J. C. Yu and P. K. Wong, Water Res., 2008, 42, 4827-4837; S. Balci, C. Kocabas, S. Ates, E. Karademir, O. Salihoglu and A. Aydinli, Phys. Rev. B: Condens. Matter Mater. Phys., 2012, 86, 235402; Y. J. Bao, B. Zhang, Z. Wu, J. W. Si, M. Wang, R. W. Peng, X. Lu, J. Shao, Z. F. Li, X. P. Hao and N. B. Ming, Appl. Phys. Lett., 2007, 90, 251914-251917; H. J. Chen, X. S. Kou, Z. Yang, W. H. Ni and J. F. Wang, Langmuir, 2008, 24, 5233-5237; G. Park, C. Lee, D. Seo and H. Song, Langmuir, 2012, 28, 9003-9009; M. S. Yavuz, G. C. Jensen, D. P. Penaloza, T. A. P. Seery, S. A. Pendergraph, J. F. Rusling and G. A. Sotzing, Langmuir, 2009, 25, 13120-13124; each incorporated herein by reference in its entirety). Additionally, the blue shift of the absorption edge in the absorption spectra following the n-Pd loading on n-$WO_3$ appears too small to account for the substantial enhancement in the photo-catalytic SRB deactivation activity exhibited by n-Pd/$WO_3$. On the other hand, the higher photo-catalytic activity of n-Pd/$WO_3$ relative to n-$WO_3$ correlated with the significantly reduced photoluminescence signal in n-Pd/$WO_3$ as shown in FIG. 9, indicative of a reduced electron-hole pair recombination. By contrast, the n-Pd loading on n-$TiO_2$ resulted in no significant change in the photoluminescence signal, correlating with no improvement in the photo-catalytic SRB deactivation activity of n-Pd/$TiO_2$ relative to n-$TiO_2$.

The invention claimed is:

1. A fixed bed method of disinfecting a fluid, comprising:
preparing a photocatalyst and disposing the photocatalyst on a substrate to form a photocatalyst/substrate composite,
passing the fluid, which comprises at least one live microbial organism, through a fixed bed reactor containing the photocatalyst/substrate composite to contact the fluid comprising the at least one microbial organism with an effective amount of the photo-catalyst while exposing the fluid and the photo-catalyst to light from at least one light source with a wavelength of about 300-550 nm to reduce the number of the at least one live microbial organism to a predetermined level,
wherein the photo-catalyst comprises tungsten trioxide nanoparticles doped with palladium nanoparticles,
wherein the palladium nanoparticles are present in an amount of about 0.1-5% of the total weight of the tungsten trioxide nanoparticles and the palladium nanoparticles, and
wherein the tungsten trioxide nanoparticles doped with the palladium nanoparticles have a first band gap energy, tungsten trioxide nanoparticles which are not doped with palladium nanoparticles have a second band gap energy, and wherein the difference between the first band gap energy and the second band gap energy is less than 10% of the second band gap energy.

2. The method of claim 1, wherein the at least one live microbial organism is at least one selected from the group consisting of bacteria, a virus, bacterial spores, protozoa, and fungi.

3. The method of claim 1, wherein the tungsten trioxide nanoparticles have an average particle size of 60-100 nm.

4. The method of claim 1, wherein the tungsten trioxide nanoparticles have a plate and/or cylindrical shape.

5. The method of claim 1, wherein the fluid further comprises at least one hydrocarbon, and the live microbial organism is a sulfate-reducing bacterium.

6. The method of claim 5, wherein the effective amount of the photo-catalyst ranges from about 0.5 mg/ml to 1.5 mg/ml of the fluid.

7. The method of claim 5, wherein the fluid is treated with at least one selected from the group consisting of oxygen, ozone, and a peroxide before and/or during the contacting and the exposing.

8. The method of claim 5, wherein the fluid is contacted with the photo-catalyst and exposed to the light at a temperature of about 4-100° C. and a pressure of about 0.1-100 bar.

9. The method of claim 1, wherein the substrate comprises at least one selected from the group consisting of glass, stone, masonry, a metal, wood, a plastic, concrete, fibers, textiles, yarns, a ceramic, alumina, carbon, silica, an organic polymer, silicon carbide, silicon nitride, boron nitride, zirconium, and tungsten carbide.

10. The method of claim 1, further comprising removing the photo-catalyst from the fluid after the contacting and the exposing.

11. The method of claim 1, wherein the photo-catalyst further comprises at least one co-catalyst selected from the group consisting of CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, CeO, and $CeO_2$.

12. The method of claim 11, wherein the co-catalyst is $CeO_2$, and wherein the molar ratio of tungsten trioxide:$CeO_2$ in the photo-catalyst lies in the range of 1:5 to 5:1.

* * * * *